(12) United States Patent
Shahvirdi Dizaj Yekan et al.

(10) Patent No.: US 11,664,881 B2
(45) Date of Patent: May 30, 2023

(54) METHOD AND APPARATUS FOR WIRELESS INFRASTRUCTURE

(71) Applicant: Metawave Corporation, Carlsbad, CA (US)

(72) Inventors: Taha Shahvirdi Dizaj Yekan, San Diego, CA (US); Maha Achour, Encinitas, CA (US); Jun Fang, San Jose, CA (US)

(73) Assignee: METAWAVE Corporation, Carlsbad, CA (US)

( * ) Notice: Subject to any disclaimer, the term of this patent is extended or adjusted under 35 U.S.C. 154(b) by 69 days.

(21) Appl. No.: 16/997,816

(22) Filed: Aug. 19, 2020

(65) Prior Publication Data

US 2021/0058137 A1 Feb. 25, 2021

Related U.S. Application Data

(60) Provisional application No. 62/889,247, filed on Aug. 20, 2019, provisional application No. 62/888,939, filed on Aug. 19, 2019, provisional application No. 62/888,618, filed on Aug. 19, 2019.

(51) Int. Cl.
*H04B 7/08* (2006.01)
*H01Q 3/16* (2006.01)
*H04B 7/145* (2006.01)

(52) U.S. Cl.
CPC ............. *H04B 7/0897* (2013.01); *H01Q 3/16* (2013.01); *H04B 7/082* (2013.01); *H04B 7/145* (2013.01)

(58) Field of Classification Search
CPC ............... H01Q 21/0018; H01Q 15/14; H01Q 15/0086; H01Q 1/246; H01Q 3/46
See application file for complete search history.

(56) References Cited

U.S. PATENT DOCUMENTS

| | | | |
|---|---|---|---|
| 2012/0162010 A1* | 6/2012 | Georgiadis | E02D 29/14 342/368 |
| 2013/0229296 A1* | 9/2013 | Maruyama | H01Q 15/008 342/5 |
| 2015/0022414 A1* | 1/2015 | Maruyama | H01Q 15/0086 343/912 |
| 2015/0102973 A1* | 4/2015 | Hand | H01Q 19/18 343/837 |
| 2017/0040711 A1* | 2/2017 | Rakib | H01Q 25/002 |
| 2019/0101640 A1* | 4/2019 | Devaraj | H01Q 9/0435 |

* cited by examiner

*Primary Examiner* — Rahel Guarino
(74) *Attorney, Agent, or Firm* — Sandra Lynn Godsey

(57) ABSTRACT

Examples disclosed herein relate to a meta-structure based reflectarray for beamforming wireless applications and a method of operation of passive reflectarrays in an indoor environment. The method includes receiving, by a plurality of passive reflectarrays, a Radio Frequency (RF) signal from a source. The method also includes reflecting, by the plurality of passive reflectarrays, the RF signal to generate a plurality of RF beams to a respective target coverage area, in which each of the plurality of RF beams increases a multipath gain along a signal path between a corresponding passive reflectarray to the respective target coverage area.

19 Claims, 31 Drawing Sheets

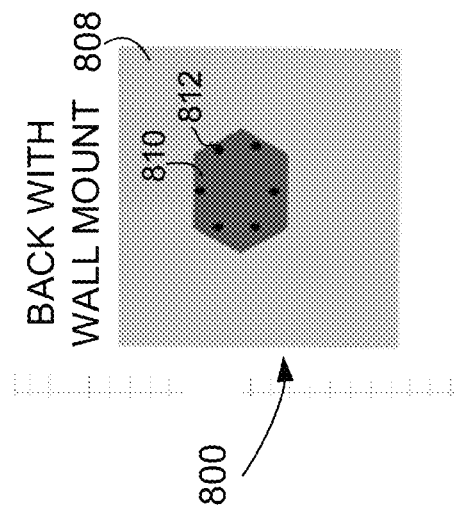
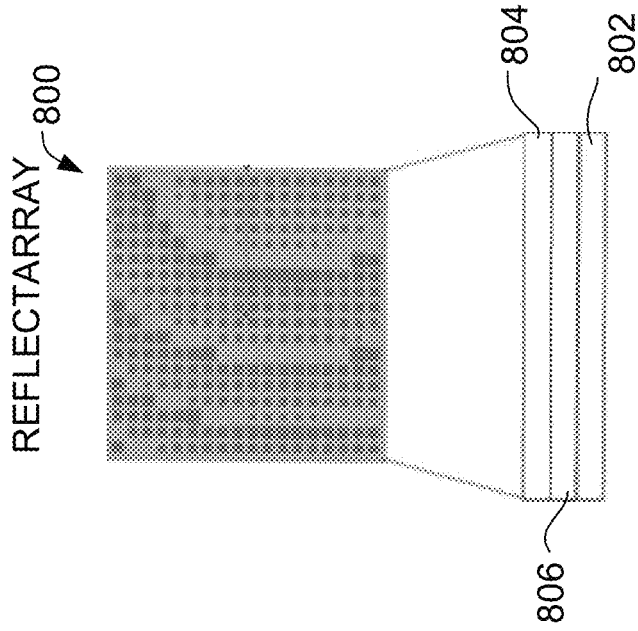
FIG. 8
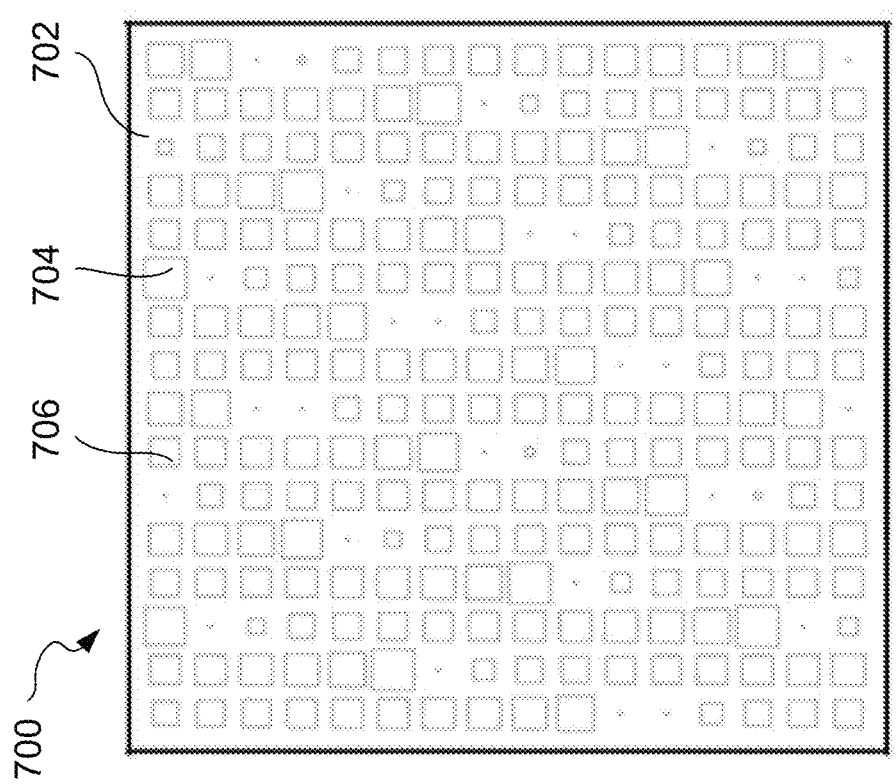
FIG. 7

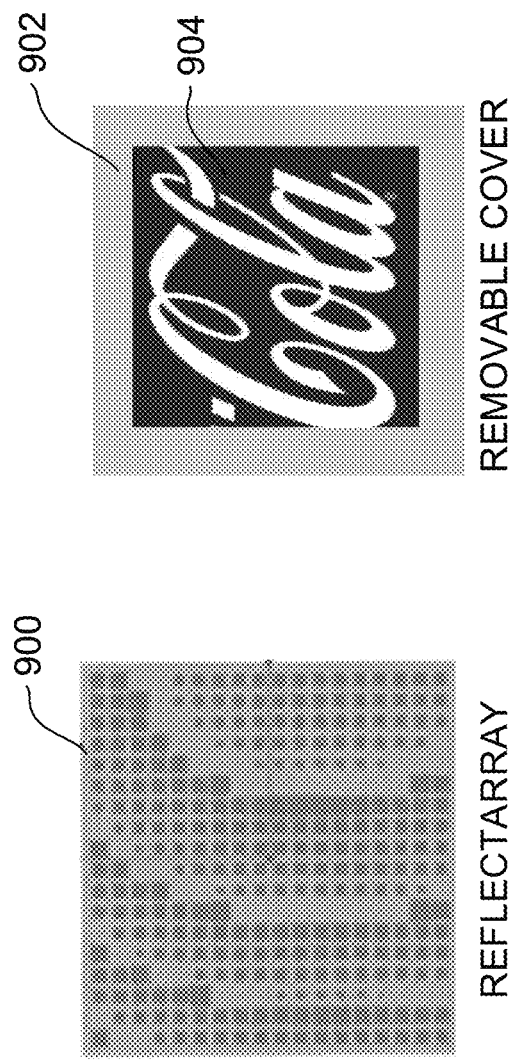
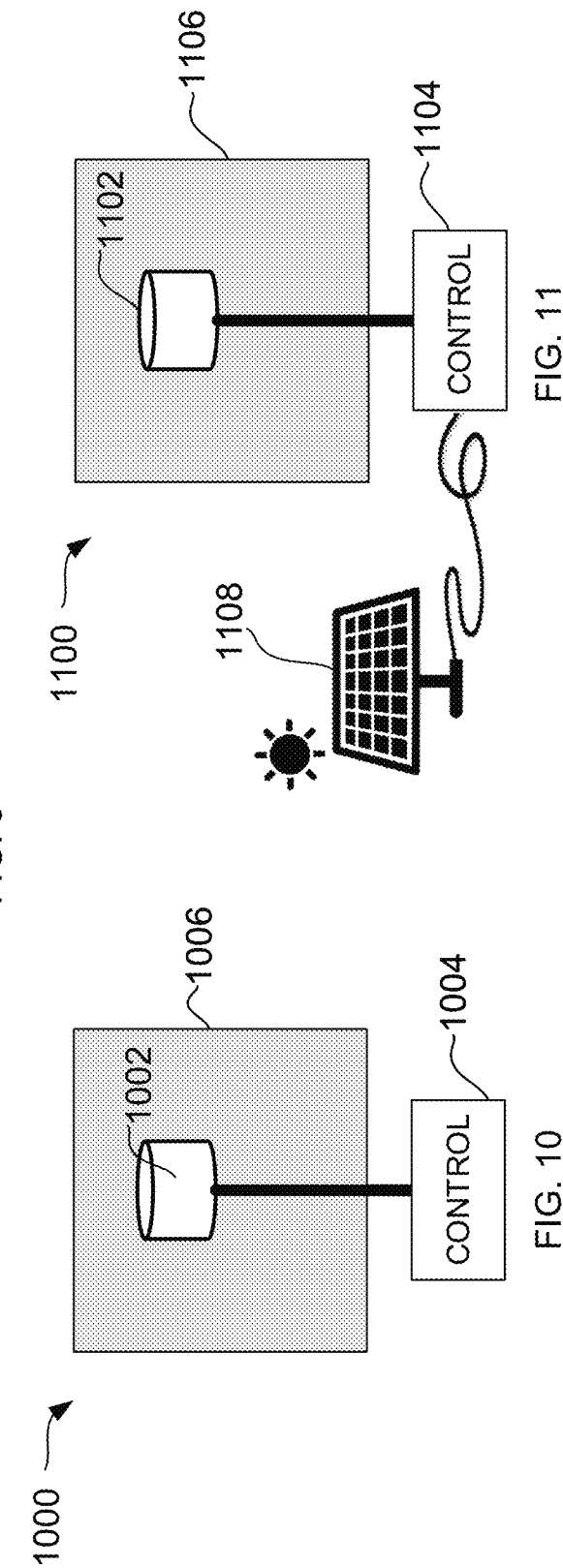

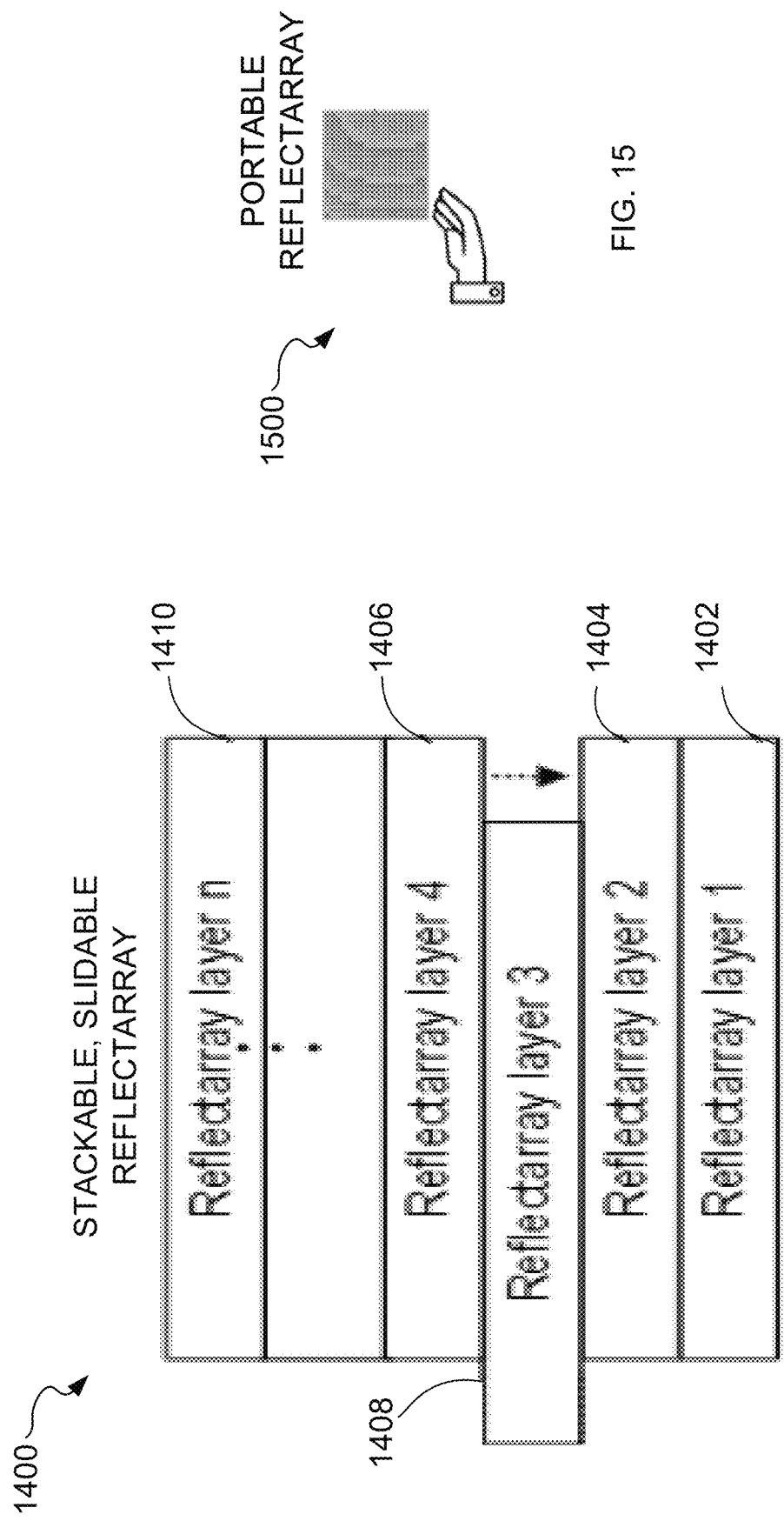

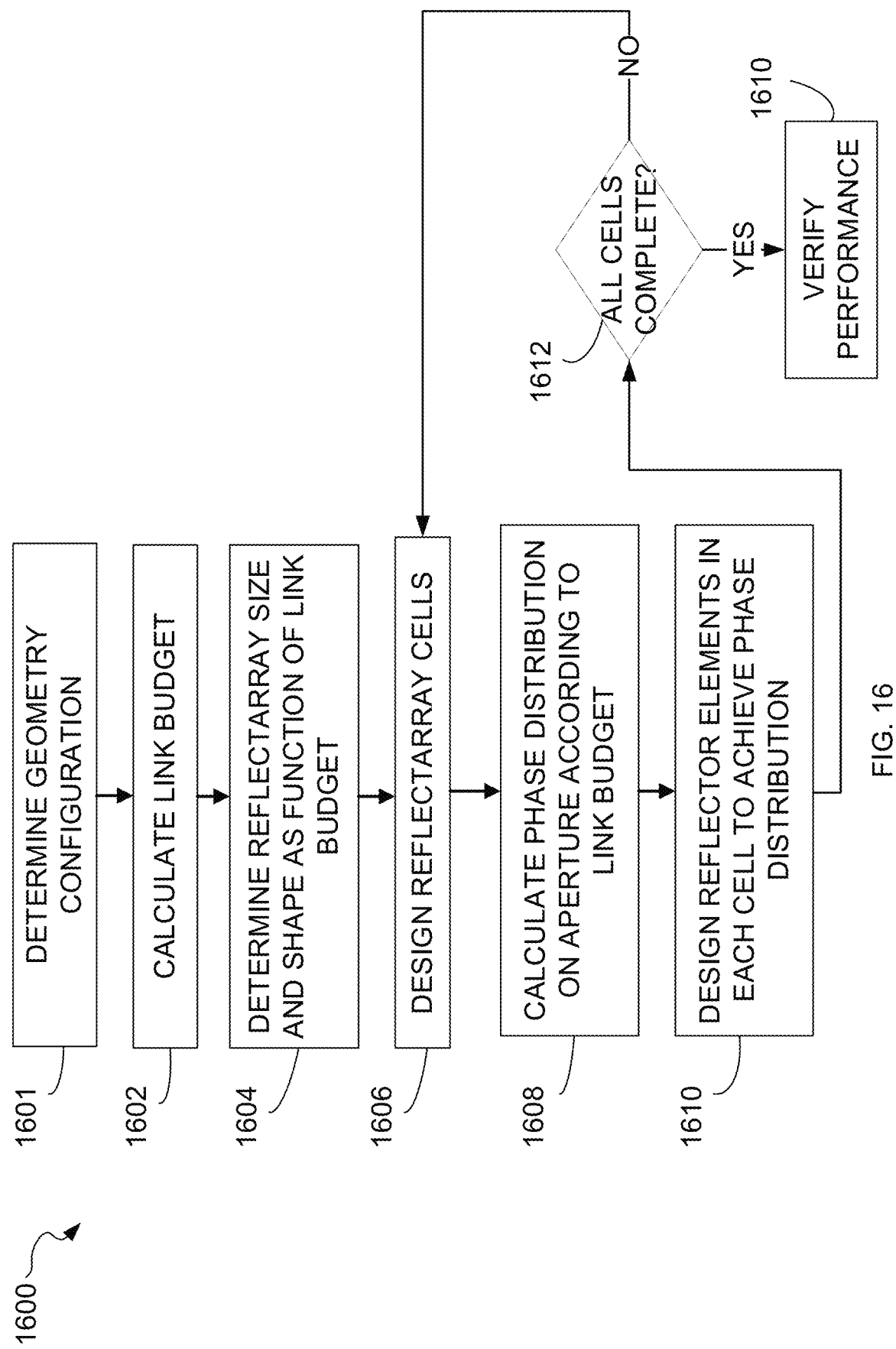

METHOD AND APPARATUS FOR WIRELESS INFRASTRUCTURE

CROSS-REFERENCE TO RELATED APPLICATIONS

The present application for patent claims priority to U.S. Provisional Application No. 62/889,247, entitled "FOCUSED META-STRUCTURE BASED REFLECTARRAYS FOR ENHANCED WIRELESS COMMUNICATIONS," filed on Aug. 20, 2019 and incorporated by reference herein; U.S. Provisional Application No. 62/888,618, entitled "META-STRUCTURE BASED REFLECTARRAYS PROVIDING MULTIPLE FREQUENCIES FOR ENHANCED 5G APPLICATIONS," filed on Aug. 19, 2019 and incorporated by reference herein; and U.S. Provisional Application No. 62/888,939, entitled "USING REFLECTARRAYS FOR BACKHAUL CONNECTIONS," filed on Aug. 19, 2019 and incorporated by reference herein.

BACKGROUND

New generation wireless networks are increasingly becoming a necessity to accommodate user demands. Mobile data traffic continues to grow every year, challenging the wireless networks to provide greater speed, connect more devices, have lower latency, and transmit more and more data at once. Users now expect instant wireless connectivity regardless of the environment and circumstances, whether it is in an office building, a public space, an open preserve, or a vehicle. In response to these demands, new wireless standards have been designed for deployment in the near future. A large development in wireless technology is the fifth generation of cellular communications ("5G") which encompasses more than the current Long-Term Evolution ("LTE") capabilities of the Fourth Generation ("4G") and promises to deliver high-speed Internet via mobile, fixed wireless and so forth. The 5G standards extend operations to millimeter wave bands, which cover frequencies beyond 6 GHz, and to planned 24 GHz, 26 GHz, 28 GHz, and 39 GHz up to 300 GHz, all over the world, and enable the wide bandwidths needed for high speed data communications.

The millimeter wave ("mm-wave") spectrum provides narrow wavelengths in the range of ~1 to 10 millimeters that are susceptible to high atmospheric attenuation and have to operate at short ranges (just over a kilometer). In dense-scattering areas with street canyons and in shopping malls for example, blind spots may exist due to multipath, shadowing and geographical obstructions. In remote areas where the ranges are larger and sometimes extreme climatic conditions with heavy precipitation occur, environmental conditions may prevent operators from using large array antennas due to strong winds and storms. These and other challenges in providing millimeter wave wireless communications for 5G networks impose ambitious goals on system design, including the ability to generate desired beam forms at controlled directions while avoiding interference among the many signals and structures of the surrounding environment.

BRIEF DESCRIPTION OF THE DRAWINGS

The present application may be more fully appreciated in connection with the following detailed description taken in conjunction with the accompanying drawings, which are not drawn to scale and in which like reference characters refer to like parts throughout, and wherein

FIG. 7 is an example reflectarray with a variety of cell configurations;

FIG. 8 illustrates a reflectarray with a wall mount in its back surface in accordance with various examples;

FIG. 9 illustrates a reflectarray with a removable cover in accordance with various examples;

FIG. 10 illustrates a reflectarray with a rotation mechanism placed on its back surface in accordance to various examples;

FIG. 11 illustrates a reflectarray with a solar controlled rotation mechanism placed on its back surface in accordance to various examples;

FIG. 14 is a schematic diagram of a stackable, slidable reflectarray having multiple reflectarray layers in accordance to various examples;

FIG. 15 illustrates a portable reflectarray in accordance to various examples;

FIG. 16 is a flowchart for designing a reflectarray according to the various examples disclosed herein;

DETAILED DESCRIPTION

Meta-structure (MTS) based reflectarrays for enhanced 5G applications are disclosed, which are applicable to a variety of wireless systems and specifically to directed beam system where the transmitters are beamforming units. The beamforming transmitters operate to transmit narrow beams in specific directions and are often range limited due to the high frequency and or gain requirements. The reflectarrays are suitable for many different 5G applications and can be deployed in a variety of environments and configurations. In various examples, the reflectarrays are arrays of cells having meta-structure reflector elements that reflect incident radio frequency (RF) signals in specific directions. In some embodiments the reflectarray includes at least one metamaterial cell. A meta-structure, as generally defined herein, is an engineered, non-periodic, quasi-periodic or semi-periodic structure that is spatially distributed to meet a specific phase and frequency distribution.

It is appreciated that, in the following description, numerous specific details are set forth to provide a thorough understanding of the examples. However, it is appreciated that the examples may be practiced without limitation to these specific details. In other instances, well-known methods and structures may not be described in detail to avoid unnecessarily obscuring the description of the examples. Also, the examples may be used in combination with each other.

Figure 1:
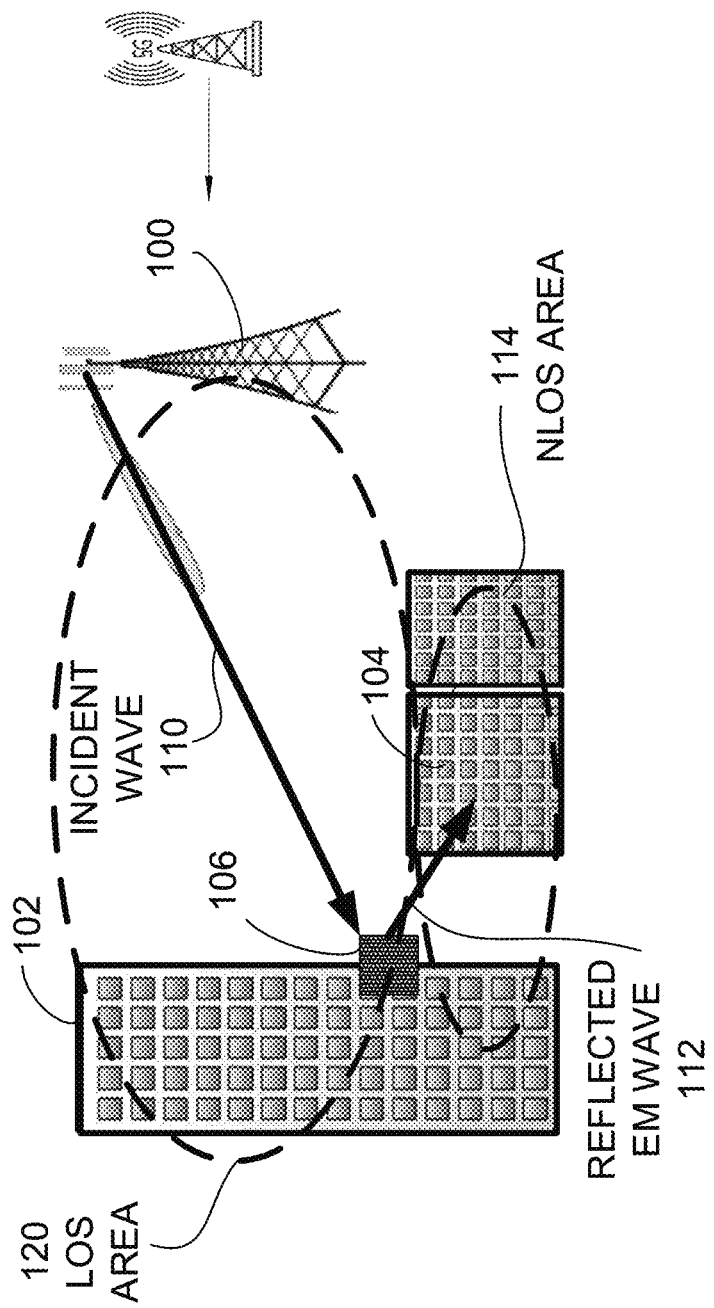
FIG. 1 illustrates an environment in which a meta-structure ("MTS") reflectarray is deployed for 5G applications in accordance to various examples.

FIG. 1 illustrates an environment in which a meta-structure based reflectarray is deployed for 5G applications according to various examples. Wireless base station (BS) 100 transmits and receives wireless signals from mobile devices within its coverage area. The coverage area may be disrupted by buildings or other structures in the environment, which may affect the quality of the wireless signals. In the illustrated example, buildings 102 and 104 affect the coverage area of BS 100 such that it has a Line-of-Sight (LOS) zone 120. A meta-structure reflector element is designed to be very small relative to the wavelength of the reflected RF signals. An incident wave 110 from BS 100 is illustrated as directed to Reflectarray 106. A reflected electromagnetic (EM) wave 112 is illustrated from reflectarray 106 toward NLOS 114. The reflectarrays operate at the higher frequencies required for 5G and at relatively short distances. Their design and configuration are driven by geometrical and link budget considerations for a given application or deployment, whether indoors or outdoors.

Users of devices outside of this zone may have either no wireless access, significantly reduced coverage, or impaired coverage of some sort. With the high frequency bands used for 5G, it is difficult to expand the coverage area outside the LOS zone 120 of BS 100. The present inventions provide solutions for the wireless industry that incorporate reflectarrays, repeaters and operate using the reflection of radio waves.

Wireless coverage can be significantly improved to users outside of the LOS zone 120 by the installation of a MTS based reflectarray 106 on a surface of building 102, such as at a wall, window, and so forth. Reflectarray 106 is a robust and low-cost relay that is positioned as illustrated between BS 100 and user equipment (UE), such as UE in building 104) to significantly improve network coverage. As illustrated, reflectarray 106 is formed, placed, configured, embedded, or otherwise connected to a portion of building 102. Although a single reflectarray 106 is illustrated for illustration purposes, multiple such reflectarrays may be placed in external and/or internal surfaces of building 102 as desired.

In various examples, reflectarray 106 is able to act as a relay between BS 100 and users within or outside of its LOS zone 120. Users in a Non-Line-of-Sight (NLOS) zone 104 are able to receive wireless signals from the BS 100 that are reflected off the reflectarray 106. With respect to BS 100 any area outside of LOS 120 is a NLOS area, however, for purposes of this example, the solution is to provide coverage to the NLOS area 112. Various configurations, shapes, and dimensions may be used to implement specific designs and meet specific constraints. The reflectarray 106 can be designed to directly reflect the wireless signals from BS 100 in specific directions from any desired location in the illustrated environment, be it in a suburban quiet area or a high traffic, high density city block. Use of a reflectarray such as reflectarray 106 and designed as disclosed herein can result in a significant performance improvement of multiple times current 5G data rates.

Figures 2, 5:
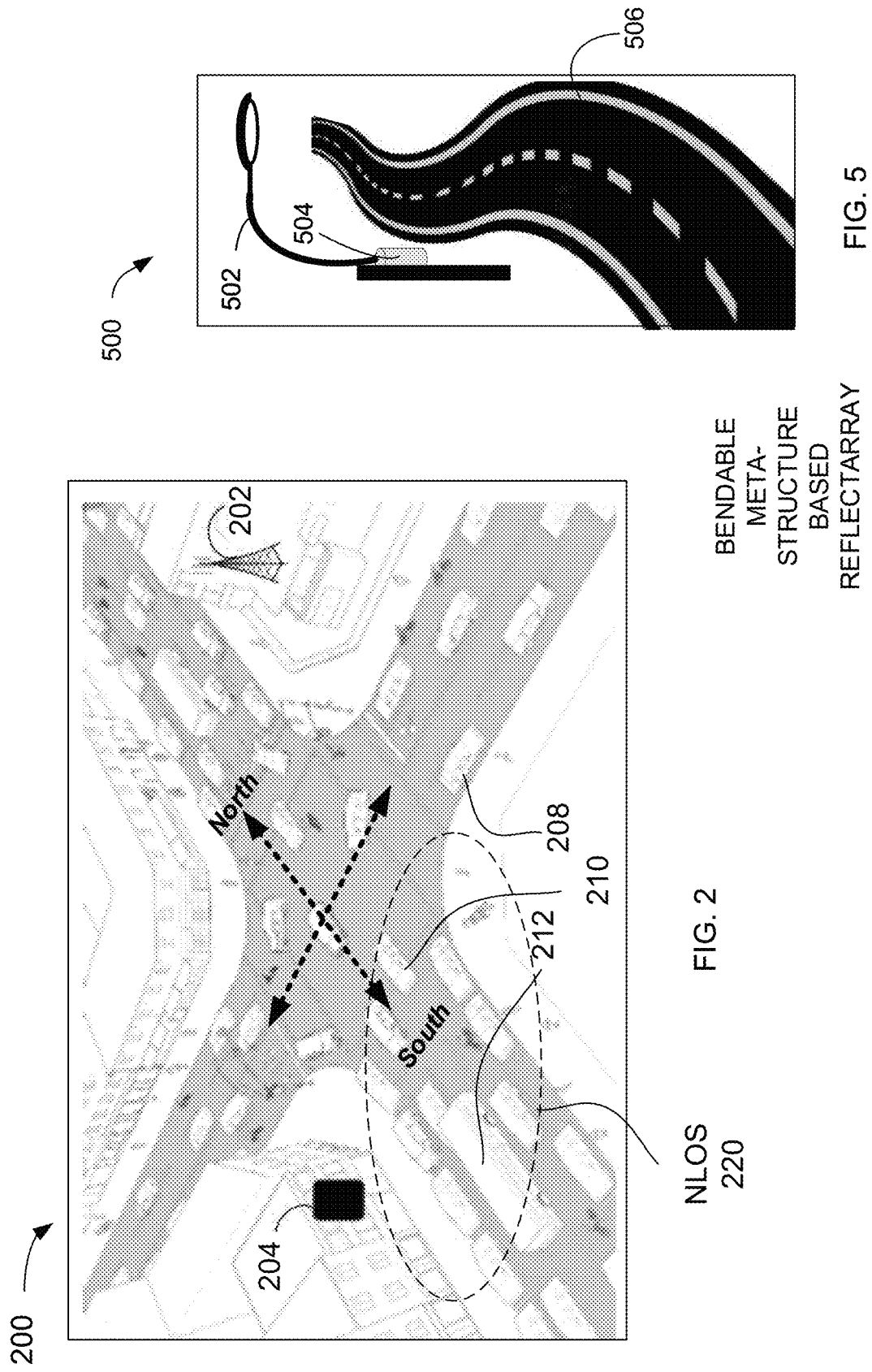
FIG. 2 illustrates a city environment in which a MTS based reflectarray is deployed for 5G applications in accordance to various examples.
FIG. 5 illustrates a 5G application in which a MTS reflectarray is used to improve wireless coverage and performance in accordance to various examples.

FIG. 2 illustrates a city environment 200 in which a MTS based reflectarray 204 is deployed to significantly improve 5G wireless coverage. Environment 200 is a high traffic, high density city block in which BS 202 provides wireless coverage to a large number of UE, such as Wi-Fi on Bus 212, and communication module in vehicle 210, and autonomous control unit in vehicle 208. Depending on the placement of BS 202, its wireless coverage can be optimized for UE located in the LOS of BS 202 for a given street direction, such as North-South. If a UE is located in a perpendicular street direction, then that UE may suffer from diminished coverage. With the millimeter wave spectrum susceptible to environmental effects, the BS 102 may not be able to provide the same wireless performance in all directions. Use of a MTS based reflectarray 204 solves this problem, as RF signals from BS 202 can reflect off reflectarray 204 to NLOS 220 directions or directions in which wireless coverage and performance are affected by the dense conditions of environment 200. Note that multiple reflectarrays may be positioned throughout the environment 200; the reflect array 204 and the NLOS 220 are provided as an example.

Figure 3:
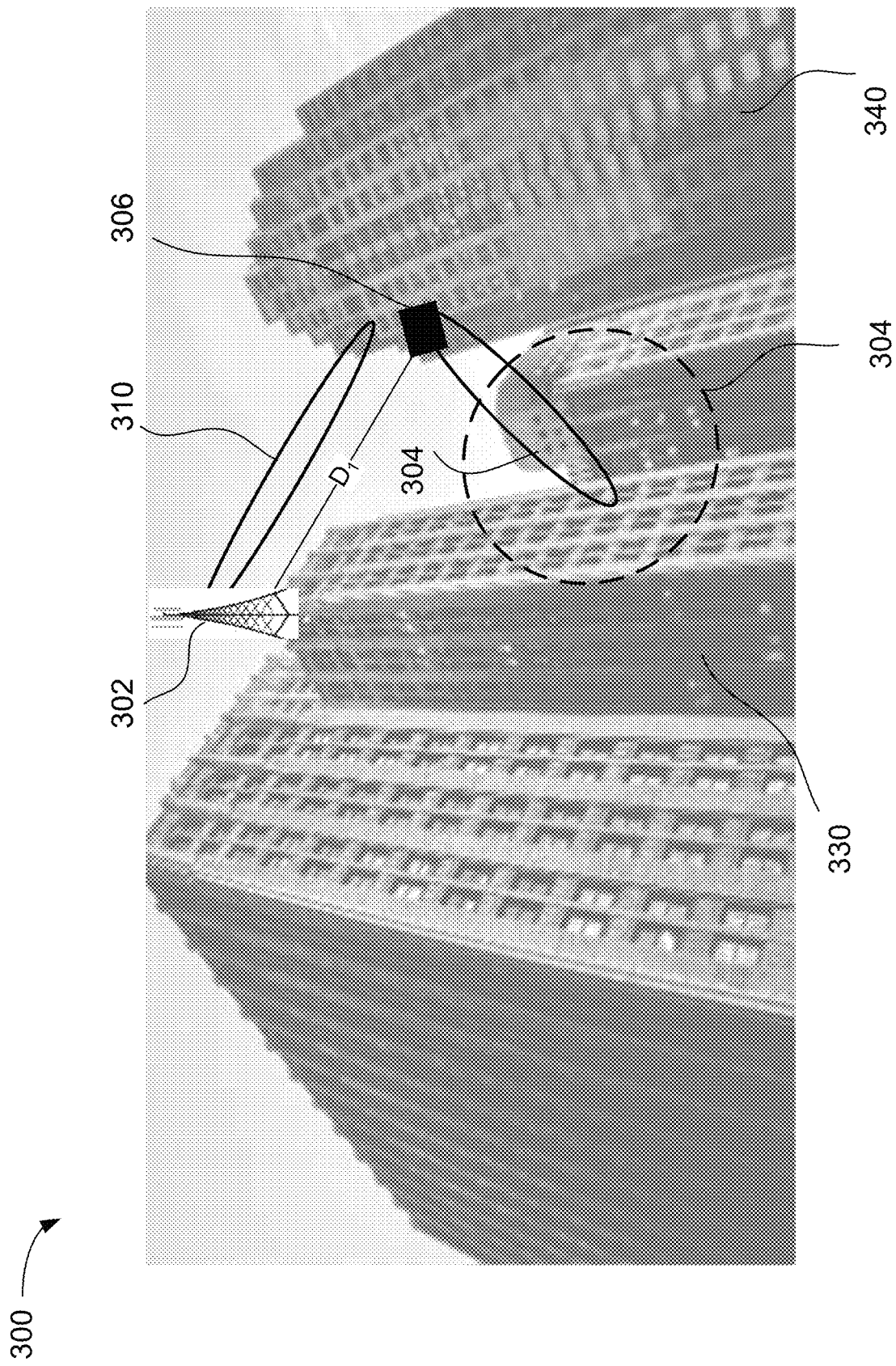
FIG. 3 illustrates another environment in which a MTS based reflectarray can be deployed to significantly improve 5G wireless coverage and performance in accordance to various examples.

FIG. 3 illustrates another environment 300 in which a MTS based reflectarray 306 is deployed to significantly improve 5G wireless coverage and performance. In environment 300, BS 302 is located on top of a building that makes it difficult for it to provide good wireless coverage and performance to UE within the environment 300, including UEs that may be located in NLOS area 304. For those UEs and others in environment 300, MTS reflectarray 304 achieves a significant performance and coverage boost by reflecting RF signals from BS 302, such as reflecting directed beam 310 as reflection 304, and in strategic directions. The design of the reflectarray 304 and the determination of the reflection direction(s) for wireless coverage and performance improvements is a function of the geometrical configurations of the environment 300, such as the placement of BS 302 on building 330 and the distance or relative distance to reflectarray 304, as well as link budget calculations from BS 302 to reflectarray 304 on building 340 in environment 300, as described in more detail hereinbelow. The reflectarray 304 is in a fixed location and has a fixed reflection behavior; alternate embodiments may implement a reconfigurable Reflectarray, such as to change the reflection behavior, and/or may be repositionable within environment 300. This flexibility may be used where the wireless traffic patterns change.

Figure 4:
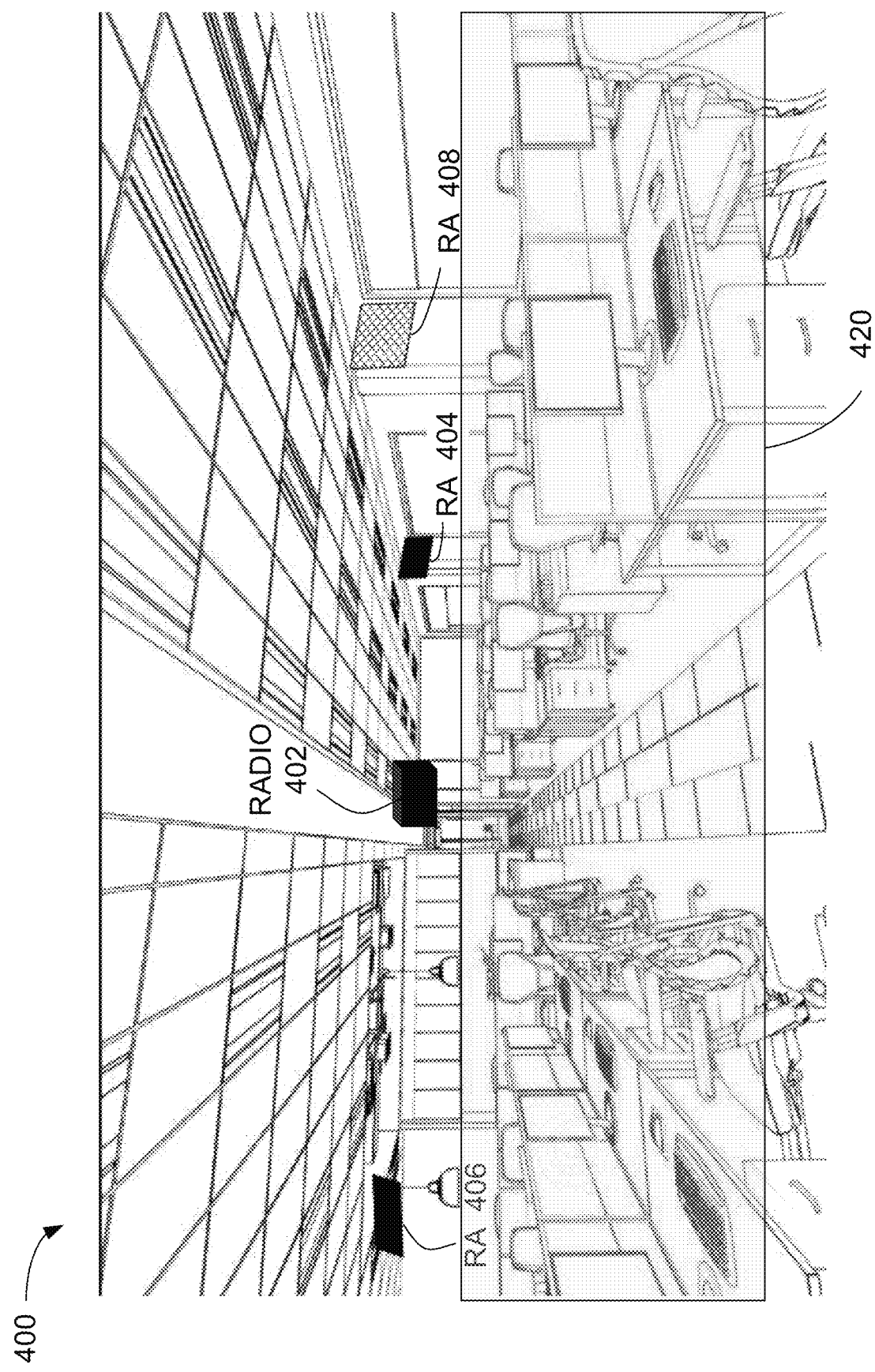
FIG. 4 illustrates placement of MTS reflectarrays in an indoor set up according to various examples.

Note that MTS reflectarrays can be placed in both outdoor and indoor environments. FIG. 4 illustrates placement of MTS reflectarrays in an indoor office configuration according to various examples. Room 400 has a wireless radio 402 placed in one of its corners. Radio 402 provides wireless coverage to UEs in room 400, such as computers and other wireless devices. The radio 402 is positioned for operation within a fixed wireless area, however, the individual UEs or other devices may move within the room 400. There may be any number of UEs in room 400 at any given time with a high demand for high speed data communications. Placement of MTS reflectarrays 404, 406 and 408 is determined by the desired coverage areas and locations to enable RF waves from radio 402 to provide coverage areas in a variety of directions and to provide a performance boost. The areas reached by the radio 402 directly, LOS areas, and the areas that require information but are not within the LOS areas, the NLOS areas, are identified during the set-up process. For example, in room 400 there is no need for coverage at the ceiling or floor but within a mid-range area 420 of the room 400. The performance boosts achieved by the MTS based reflectarrays 404, 406, 408 are due to the constructive effect of the directed beams reflected from cells of MTS reflector elements, as each of the reflectarrays 404, 406, 408 is made up of arrays of reflective elements or cells. Note that the constructive effect is achieved with a passive or active, low cost and easy to manufacture reflectarray that is crucial for enabling 5G applications.

In addition to many configurations, the reflectarrays disclosed herein are able to generate narrow or broad beams as desired. As used herein, generating beams refers to the reflection of incident beams. For example, it may be desirable for a narrow azimuth or horizontal beam, with a broad beam in elevation or vertical direction or to generate narrow elevation and broad or fan azimuth beams. This may involve multiple different frequencies, and may be implemented as single, dual, multi-band or broadband, with different materials, and so forth. The reflectarrays can reach a wide range of directions and locations in any 5G environment. These reflectarrays are low cost, easy to manufacture and set up, and may be self-calibrated without requiring manual adjustment to its operation.

Figure 13:
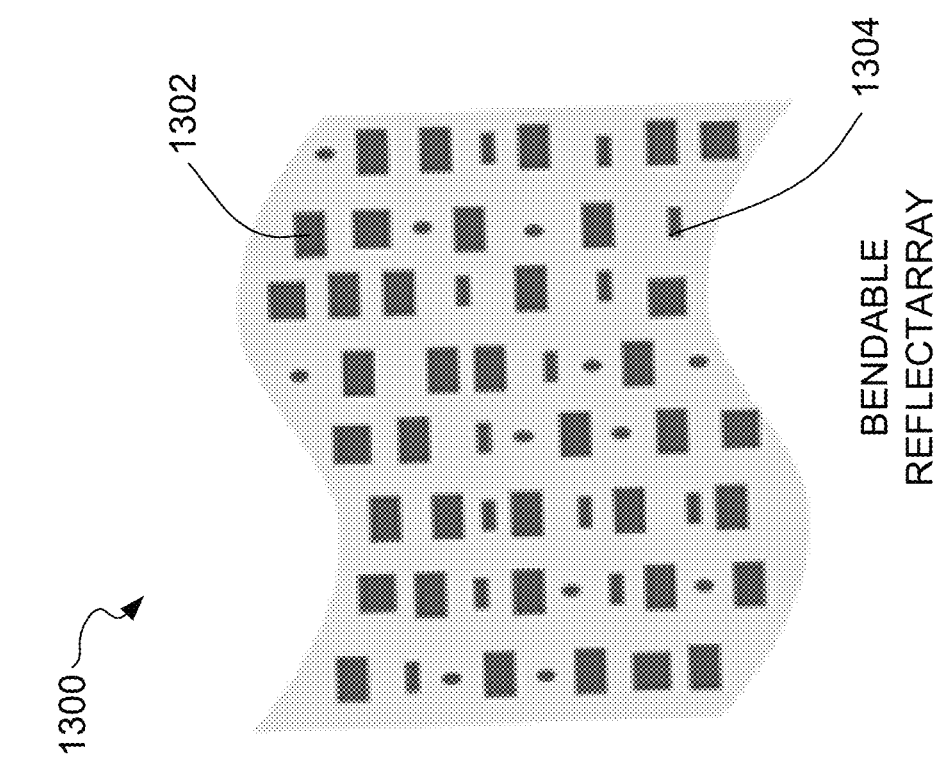
FIG. 13 illustrates a bendable reflectarray in accordance with various examples.

In one example application illustrated in FIG. 5, a reflectarray 504 is mounted to a post 502 or other such structure near a highway or road 506 to provide improved wireless coverage and 5G performance to UE in vehicles navigating the road. In this application, the reflectarray 504 can be a flat rectangular or other shape panel mounted to the post or a bendable reflectarray that can curve around the post, as also illustrated in FIG. 13.

Figure 6:
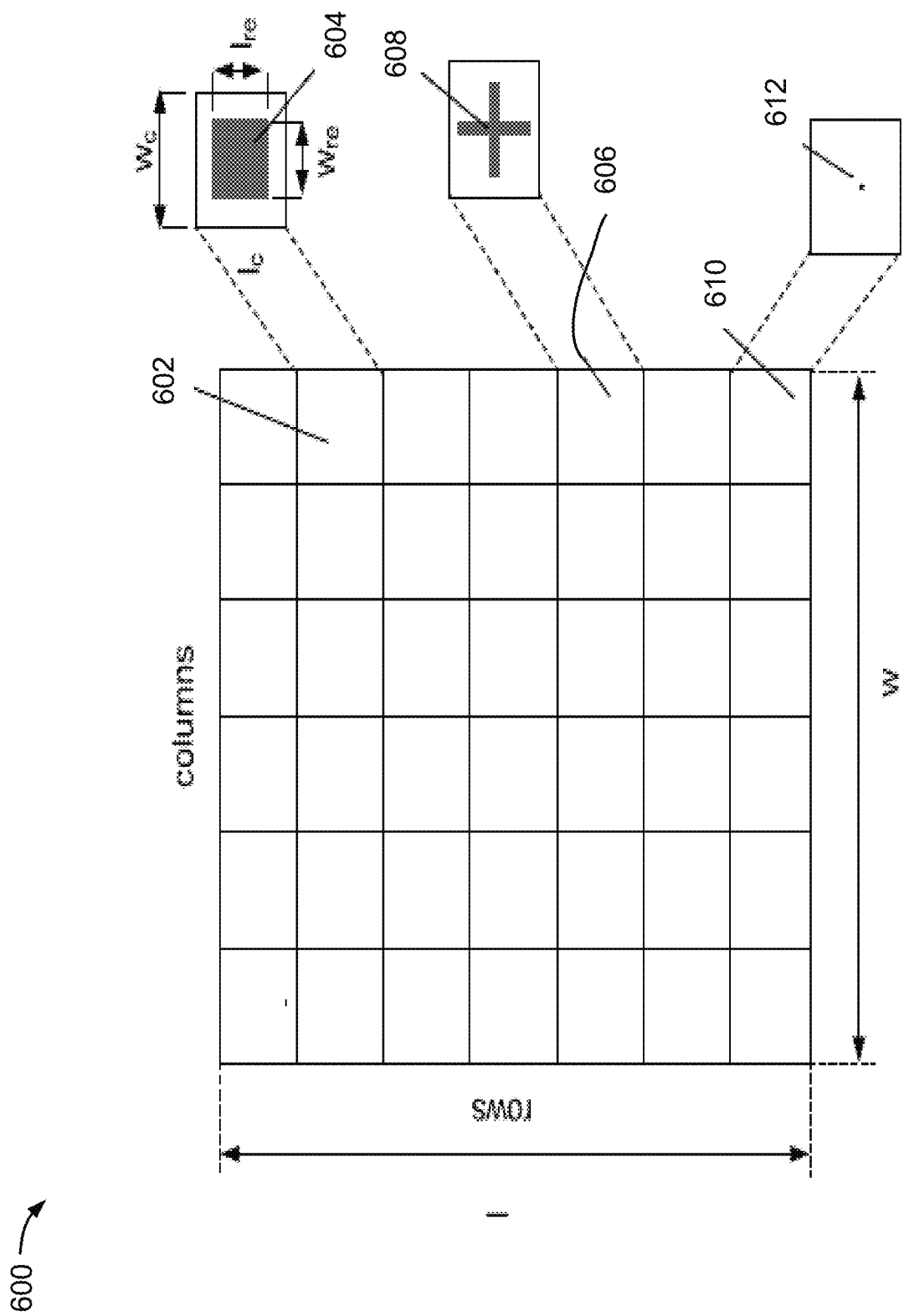
FIG. 6 is a schematic diagram of a MTS reflectarray and its cell configuration in accordance to various examples.

Attention is now directed to FIG. 6, which illustrates a schematic diagram of a MTS reflectarray 600 and its cell configuration in accordance with various examples. Reflectarray 600 is an array of cells organized in rows and columns. The reflectarray 600 may be passive or active. A passive reflectarray does not require electronics or other controls, as once in position it directs incident beams into a specific direction or directions. To change the direction(s) may require repositioning the entire reflectarray, which can be achieved by means of mechanical or electronically controlled rotating mounts on the back of the reflectarray 600, as illustrated for example, in FIGS. 8-11. The reflectarray 600 provides directivity and high bandwidth and gain due to the size and configuration of its individual cells and the individual reflector elements within those cells.

In various examples, the cells in the reflectarray 600 are MTS cells with MTS reflector elements. In other examples, the reflectarray cells may be composed of microstrips, gaps, patches, and so forth. Various configurations, shapes, and dimensions may be used to implement specific designs and meet specific constraints. As illustrated, reflectarray 600 may be a rectangular reflectarray with a length l and a width w. Other shapes, such as trapezoid, hexagon, and so forth, may also be designed to satisfy design criteria for a given 5G application, such as the location of the reflectarray relative to a wireless radio, the desired gain and directivity performance, and so on. Each cell in the reflectarray 600 has a reflector element, such as reflector element 602. The reflector elements may also have different configurations, such as a square reflector element, a rectangular reflector element, a dipole reflector element, a miniature reflector element, and so on.

For example, cell 602 is a rectangular cell of dimensions $w_c$ and $l_c$ for its width and length, respectively. Within cell 602 is a MTS reflector element 604 of dimensions $w_{re}$ and $l_{re}$. As a MTS reflector element, its dimensions are in the sub-wavelength range ($\sim\lambda/3$), with $\lambda$ indicating the wavelength of its incident or reflected RF signals. In other examples, cell 606 has a dipole element 608 and cell 610 has a miniature reflector element 612, which is effectively a very small dot in an etched or pattern printed circuit board (PCB) metal layer that may be imperceptible to the human eye. As described in more detail below, the design of the reflectarray 600 is driven by geometrical and link budget considerations for a given application or deployment, whether indoors or outdoors. The dimensions, shapes and cell configurations of the reflectarray 600 will therefore depend on the particular application. Each cell in the reflectarray 600 may have a different reflector element, as illustrated with the reflectarray 700 illustrated in FIG. 7. While the cells of reflectarray 600 are illustrated as uniform in size, shape and configuration, other embodiments may include cells of different shapes, sizes, and configurations to achieve a reflection behavior. Such reflection behavior may involve a single direction or multiple directions.

FIG. 7 illustrates a Reflectarray 700 having a variety of cell sizes and shapes, which are organized in an asymmetric configuration. For example, cell 702 is a first size, cell 704 is a second size and cell 706 is a third size. The cells are configured on a surface of the reflectarray 700 structure which may be built on a variety of materials, such as a PCB substrate.

FIG. 8 illustrates a reflectarray 800 with a wall mount 810 on a back surface in accordance with various examples. Reflectarray 800 in this example has a high manufacturability as it can be made of low-cost PCB materials suitable for high frequency operation. As illustrated, reflectarray 800 has a metal ground plane 802 and a patterned metal layer 804 surrounding a dielectric material 806 sandwiched therebetween. This structure is determined according to the application, placement, size, and shape of reflectarray 800. The reflector elements of the reflectarray 800 may be etched or deposited into a metal material to form the patterned metal layer 804. In various examples, the metal ground plane 802 and the patterned metal layer 804 are copper layers surrounding a composite dielectric material. Other materials may be used to design the reflectarray 800 depending on the desired performance of a given 5G application. A back surface 808 can be attached to the ground plane layer 802 of reflectarray 800 to provide a mount 810 for a wall or other like surface. The wall mount 810 may mount to the wall by means of screws 812.

Figure 32:
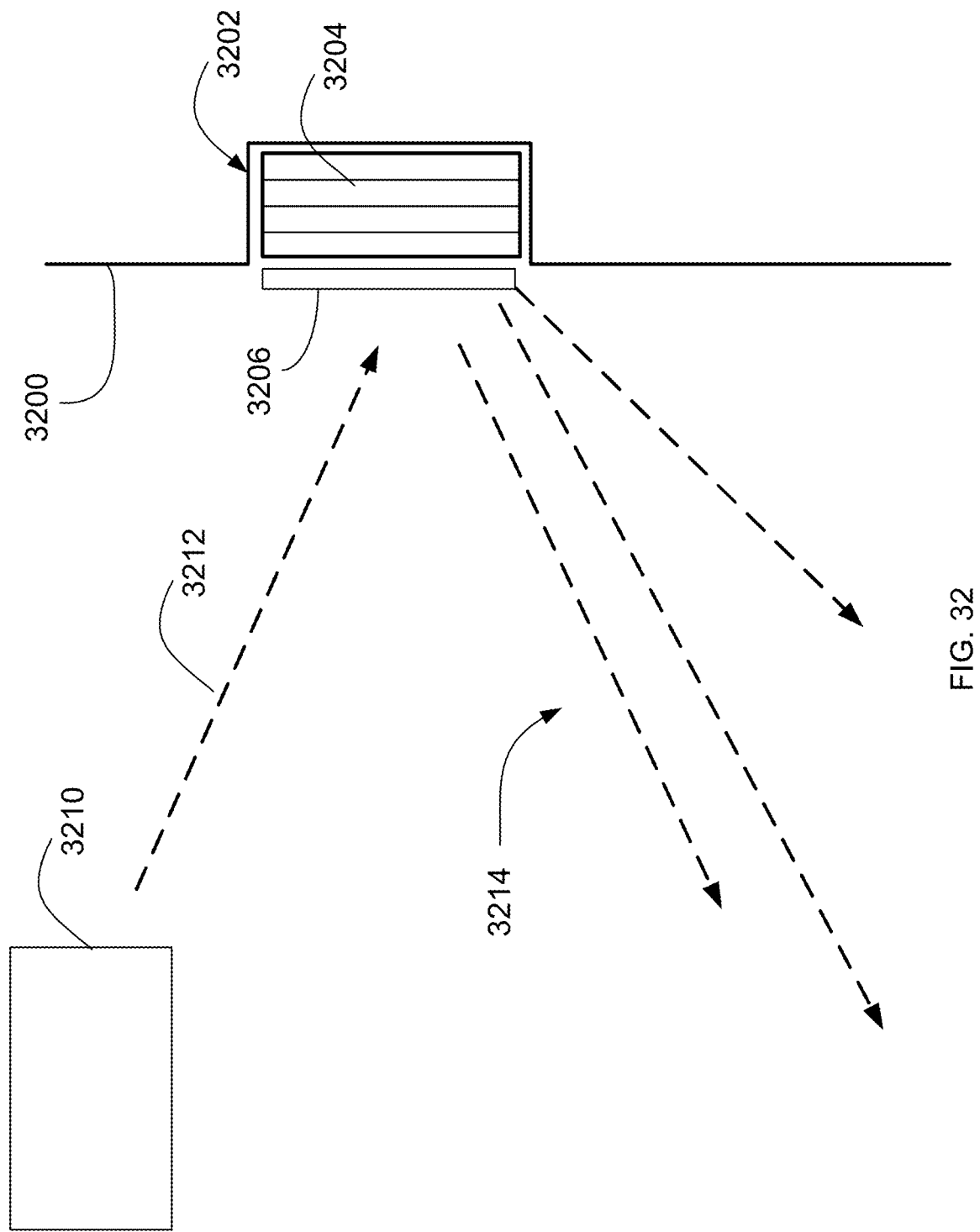
FIG. 32 is a schematic diagrams of a system utilizing MTS reflectarrays for backhaul connections between base stations and user equipment, according to various examples.

There are a variety of configurations that may be implemented, such as to incorporate a reflectarray panel into a pre-sized mounting on the wall of a building. In FIG. 32, a wall 3200 has an insert 3203 for placement of a reflectarray 3204, having multiple layers and an optional cover 3206, such as for advertising. In this position, the radio 3210 transmit beams that are incident on reflectarray 3204, as incident wave 3212. The reflectarray redirects the incident wave 3212 as reflections 3214. While the cover 3206 sits on the front of reflectarray 3204 it does not interfere with the reflective behavior of the reflectarray 3204.

Figure 33:
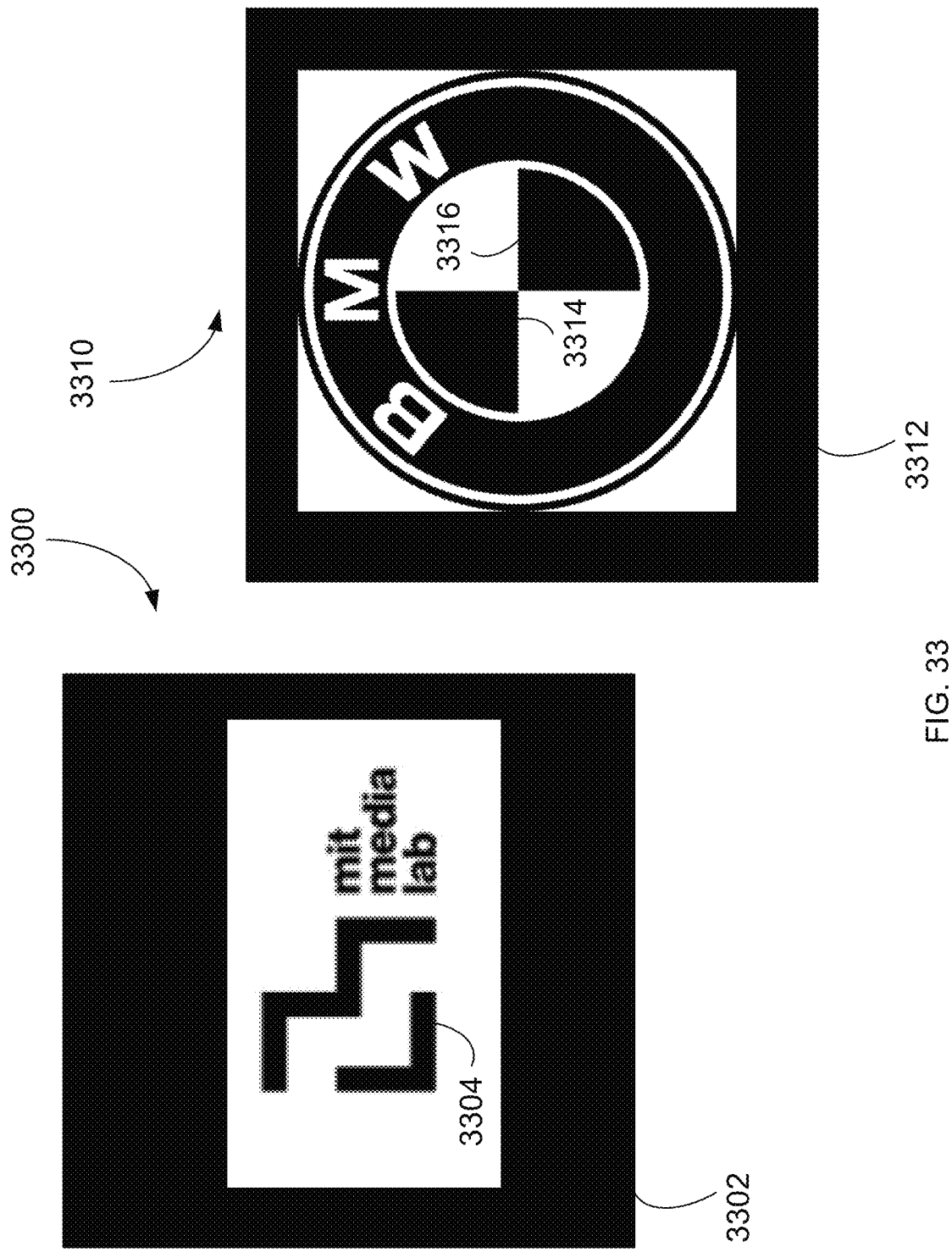
FIG. 33 is a schematic diagrams of a system utilizing MTS reflectarrays for backhaul connections between base stations and a core network, according to various examples.

In some embodiments, the advertisement or cover over the reflectarray may include reflective elements enabling modification of the reflective or redirection behavior of the reflectarray. In FIG. 33, reflectarray 3300 includes an advertisement overlay 3302 having a portion 3304 which is a material acting in coordination with the structure of the reflectarray 3300 to change the angle of reflection or enable a new angle of incidence to achieve the same redirection. In another example, reflectarray 3310 includes an overlay 3312 advertising for BMW. Built into the design of the overlay 3312 are portions 3314 and 3316, each made of one or more materials that act to modify the behavior of reflectarray 3310. In this example, the portion 3314 creates a first direction for reflections and the portion 3316 creates a second direction for reflections. When the overlay 3312 is removed, the reflectarray 3310 performs as originally designed.

In various examples, a removable cover may be placed on top of the reflectarray as desired by the application. This cover or overlay may provide additional revenue for a user or may provide additional functions or features, such as to have a QR code to purchase sodas at a sports arena or to purchase tickets at a play. There are a variety of aspects to this formation. As illustrated in FIG. 9, reflectarray 900 has a removable cover 902 that may be positioned on top of the reflectarray by various means, such as by glue, silk screening, or other such means. During the design process of the reflectarray 900 various cover materials may be used that will not interfere with the directivity performance of the reflected RF signals. For example, a fiberglass or other such material may be used to avoid modification or interference with performance. In various examples, the reflectarray 900 may be designed and simulated with the removable cover 902 to ensure that the reflectarray cells and their reflector elements will provide the desired performance. The removable cover 902 may serve a dual purpose to protect the reflectarray 900 from environmental or other damage to its surface and to enable 5G providers, emergency response systems, and others to illustrate messages, advertisements or promotions in the reflectarray 900 that are viewable by UE within its vicinity. There may be various configurations of cover 902 that enable ads and messages to be relayed from the reflectarray 900 mounted to a surface via back mount 906.

Note that there may be various applications that may require the reflectarray to change its position without having to place another reflectarray in the environment. FIG. 10 illustrates an example reflectarray 1000 that has a rotation mechanism 1002 placed on its back surface 1006 that may be mountable to a wall or other such surface. The rotating mechanism 1002 may be controllable by control circuit 1004 to change the orientation of the reflectarray 1000 as desired. The rotation mechanism can also be controlled by other means other than control circuitry 1004, such as, for example, a solar cell. FIG. 11 illustrates such a reflectarray 1100 in which a rotating mechanism 1102 on back surface 1106 is controlled by solar cell 1108.

Figure 12:
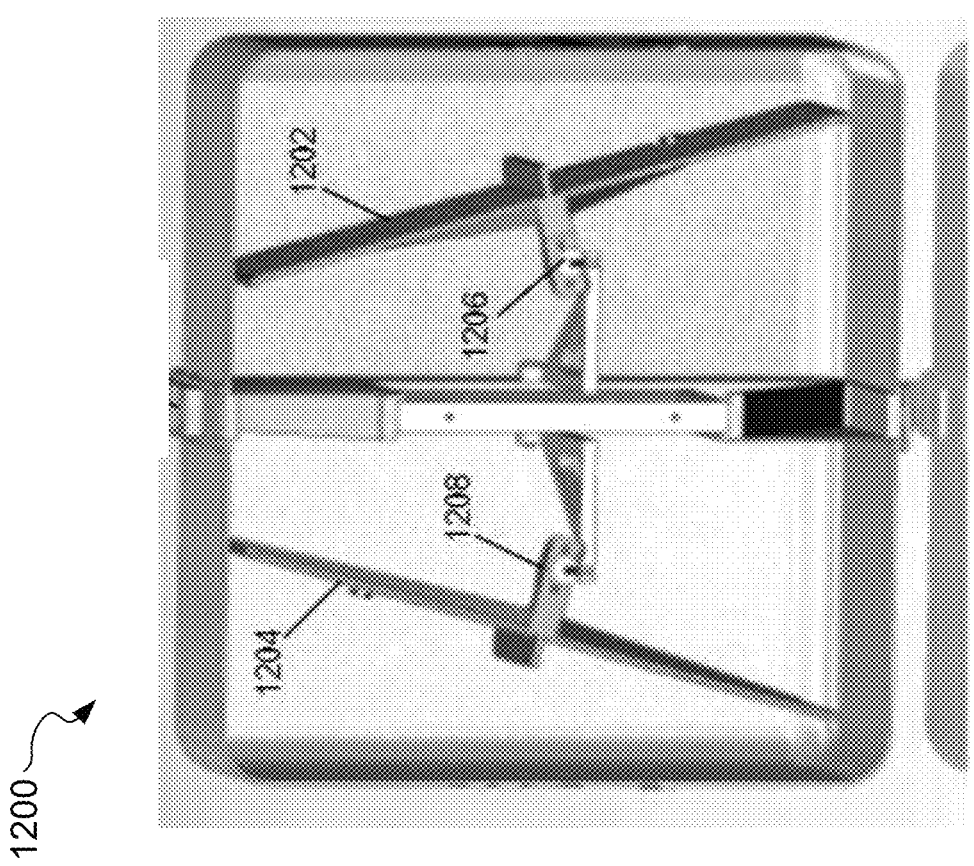
FIG. 12 illustrates a dual reflectarray on a rotating mount in accordance with various examples.

Other configurations of rotating reflectarrays may be implemented as desired. FIG. 12 illustrates an example of a dual reflectarray on a rotating mount. Structure 1200 is designed to support two reflectarrays: reflectarray 1202 and reflectarray 1204. These reflectarrays may be rotated to different orientations by rotating levers 1206 and 1208, respectively. In one example, reflectarray 1202 has a horizontal orientation and reflectarray 1204 has a vertical orientation. Their orientations can be changed as needed by the respective 5G application.

An even more flexible reflectarray in terms of its configuration and placement capabilities is illustrated in FIG. 13. Reflectarray 1300 is a bendable reflectarray that is manufactured of a bendable and flexible PCB material for applications such as that illustrated in FIG. 5, when a bendable reflectarray is illustrated mounted to a light post near a highway to provide improved wireless coverage and performance to UE in vehicles navigating the highway. The cells within reflectarray 1300 are illustrated as 1302, 1304.

FIG. 14 illustrates a stackable, slidable reflectarray in accordance with various examples. Reflectarray 1400 is a stackable structure having multiple reflectarray layers. Each reflectarray layer, e.g., reflectarray layers 1402 to 1410, is designed according to its placement in the stack. The stack may be changed as desired by the application, so that at any given time a network operator may remove a reflectarray layer from the stack, e.g., reflectarray layer 1408, while the other reflectarray layers stay in their place or are moved to accommodate the displacement of the reflectarray layer that was removed. Note that this design configuration of reflectarray 1400 enables many different 5G applications to take advantage of the capabilities of reflectarrays to provide high gain to specific directions. The stackable structure of reflectarray 1400 allows 5G network operators to select from a library or catalog of already manufactured reflectarrays to satisfy different design criteria. Similarly, a library or catalog of removable covers may be used with a single or stackable reflectarray. Note that the materials of the reflectarray layers 1402 to 1410 are selected such that RF signals are able to be reflected according to the design criteria. In various examples, a given layer may be a transparent layer able to reflect signals at a given frequency. Each reflectarray layer in the stack may be designed to reflect signals at a different frequency.

Another configuration for a reflectarray is illustrated in FIG. 15, which illustrates a portable reflectarray 1500 that may be easily transported within a 5G network as desired. The portable reflectarray 1500 may be selected from a library of reflectarrays to achieve a need within a 5G network or application. The portable reflectarray 1500 may also be a portable stackable reflectarray as illustrated in FIG. 14 or have a removable cover as illustrated in FIG. 9 that is selected from a catalog of covers. The removable cover may be used to display an ad, promotion, or message within the 5G network. The portable reflectarray 1500 is easily transportable and may be mounted to a wall or other surface as needed.

Figure 17:
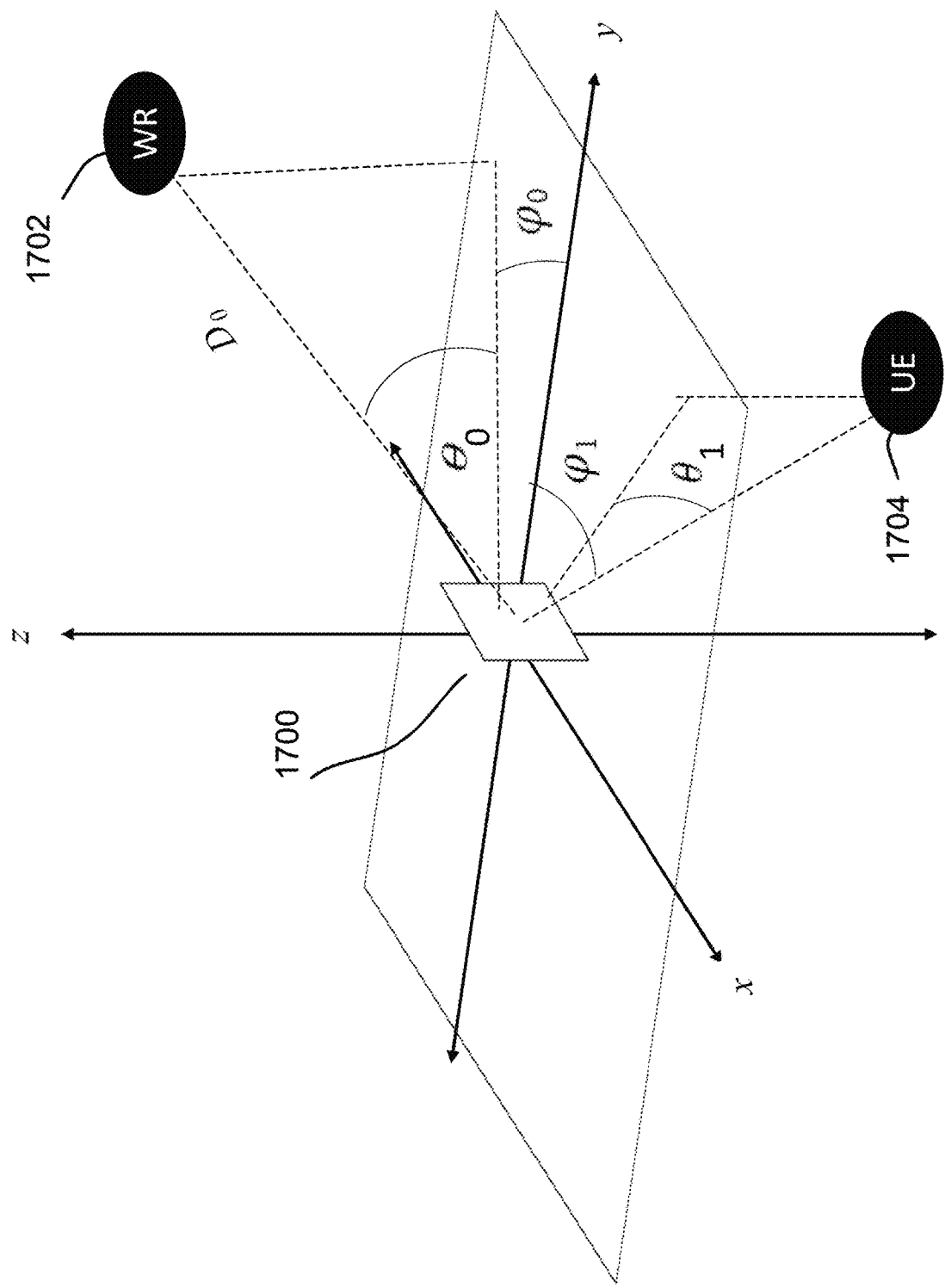
FIG. 17 illustrates a geometrical setup for a reflectarray in accordance to various examples.

Attention is now directed to FIG. 16, which illustrates a flowchart for a design process 1600 for a reflectarray according to the various examples disclosed herein. The first step in the design process is to determine the geometry setup for the desired 5G application (1601). This involves determining the position of the BS or wireless radio that provides the incident RF signals to be reflected off the reflectarray, including its distance from the reflectarray, and the orientation and position of the reflectarray itself. The geometry setup can be seen in FIG. 17, which illustrates a wireless radio (WR) 1702 located at $D_0$ from a Cartesian (x, y, z) coordinate system positioned in the center of the reflectarray 1700. The reflectarray 1700 is positioned along the x-axis with the y-axis indicating its boresight. The WR 1702 has an elevation angle $\theta_0$ and an azimuth angle $\varphi_0$. Note that determining the geometry setup is a simple procedure involving simple geometrical tools such as, for example, a laser distance measurer and an angles measurer. This highlights the ease of setup of reflectarray 1700 and further incentivizes its use when its significant wireless coverage and performance improvements are achieved at low cost with a highly manufacturable reflectarray that can be easily deployed in any 5G environment, whether indoors or outdoors.

Figure 18:
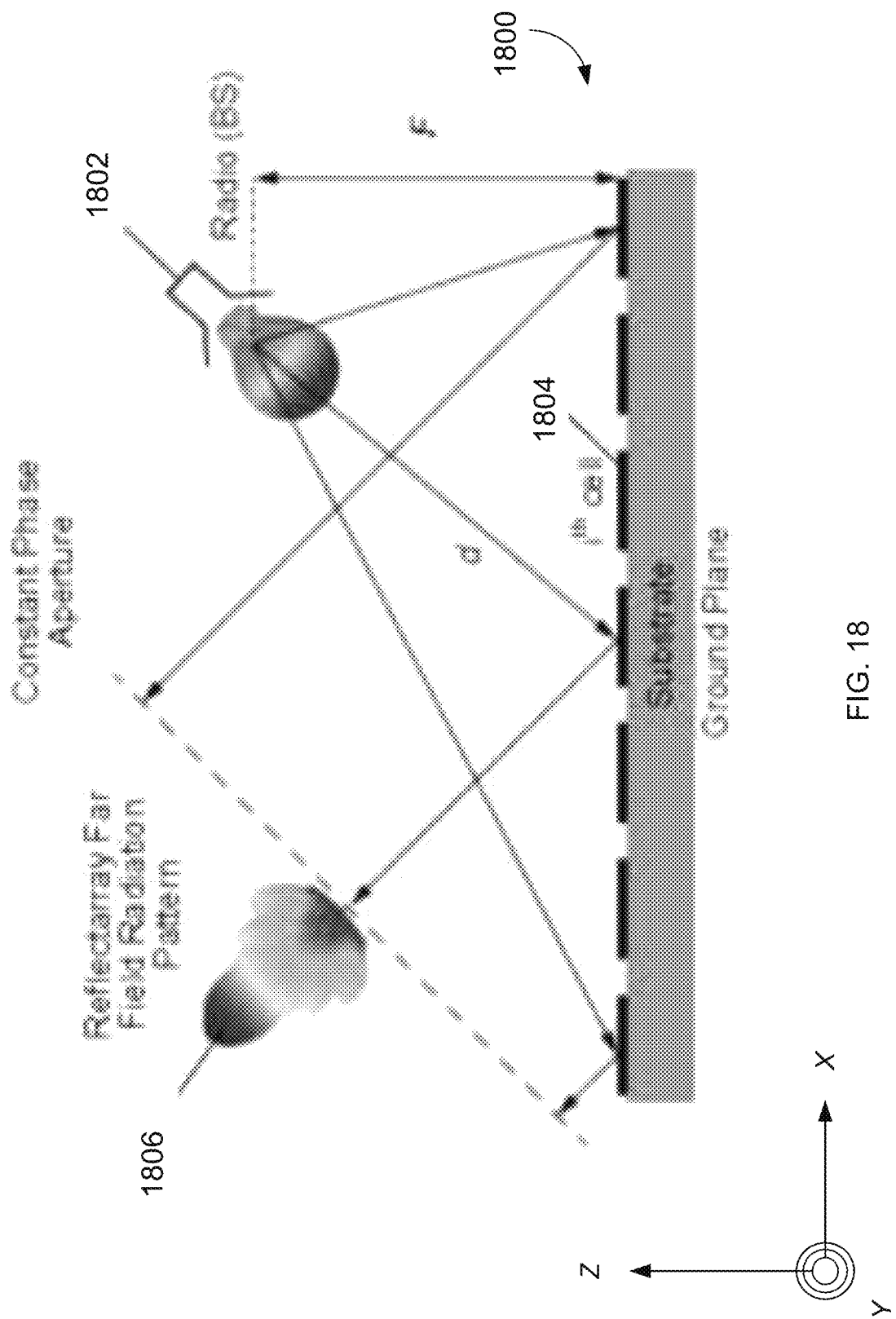
FIG. 18 illustrates a radiation pattern from a reflectarray in accordance to various examples.

The reflectarray 1700 can be used to reflect RF waves from WR 1702 into UE within the 5G network served by WR 1702, such as, for example, UE 1704 located at a distance $D_1$ from the reflectarray 1700 with $\theta_1$ elevation and $\varphi_1$ azimuth angles. FIG. 18 illustrates a far field radiation pattern 1806 that is generated from reflectarray 1800 having a metal ground plane, a dielectric substrate, and a patterned metal layer with the reflectarray cells having reflector elements, e.g., MTS reflector elements. As illustrated, BS 1802 sends RF signals to reflectarray 1800 from a distance d to $i^{th}$ cell 1804. Those RF signals are then reflected from each cell in reflectarray 1800 with RF beams. The constructive behavior of the RF beams from all cells in reflectarray 1800 is effectively an antenna gain that results in significant improvements in wireless coverage and performance to UE receiving the radiation pattern 1806.

Returning to FIG. 16, once the geometry setup is determined, the next step is to calculate a link budget for the 5G application (1602). The link budget is a calculation that takes as inputs parameters identifying the gain profile of the BS, such as, for example, its center frequency, bandwidth, Tx power, effective isotropic radiation power (EIRP), antenna gain, beam-width, polarization, Rx sensitivity, and location ($D_0$, $\theta_0$, $\varphi_0$), and parameters or gain profile of an UE within reach of the BS, such as, for example, its Tx power or EIRP, antenna gain, beam-width, polarization, Rx sensitivity, and location ($D_1$, $\theta_1$, $\varphi_1$). The output of the link budget calculation determines the size and shape of the reflectarray, as well as its expected gain, beam-width, and location in terms of azimuth and elevation angles for both uplink and downlink communications (1604).

Figure 19:
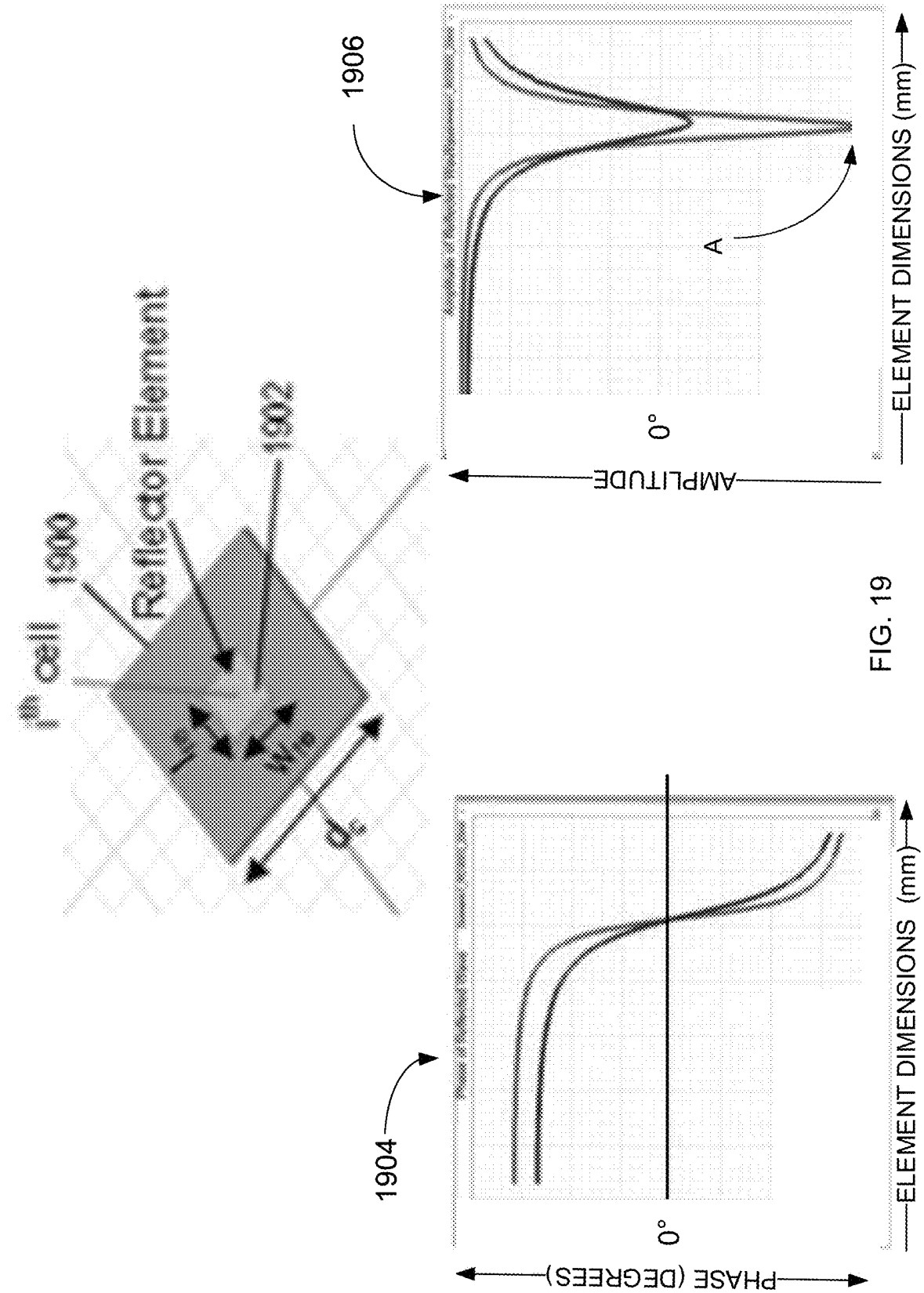
FIG. 19 illustrates a reflectarray cell and its phase and amplitude distribution according to various examples.

Design of the patch or element of a reflectarray cell is illustrated in FIG. 19 where an element having dimensions such as (l×w) for a rectangle is synthesized with results as illustrated in plots 1904, 1906. For a first configuration describing the environmental locations of radio and target areas, the phase behavior (y-axis) for a given element size has a behavior that changes at a specific element size (x-axis). This behavior is used to select a size of the element, which may be a function of one or more dimensions of the element. The plot 1906 illustrates the amplitude of the reflected signal of an element as a function of element size and is used in collaboration with the plot of 1904 to select a size and shape of elements of a reflectarray. In the present inventions, the elements may be periodic or quasi-periodic, wherein the quasi-periodic structure has a gradual shape or size change across the reflectarray. This synthesized information provides information for one or more of the elements of a reflectarray.

FIG. 19 illustrates some of the fundamental graphs used in the design phase of a reflectarray. There are other plots that may be synthesized to capture the full or desired behavior of a reflectarray. For example, where the entire array has a composite reflection behavior, the synthesis may be performed for one or more of the cells to capture the behavior desired. In other embodiments, where multiple reflection behaviors are desired, such as a first reflection directivity from a first portion of the reflectarray and a second reflection directivity from a second portion of the reflectarray. The synthesis is used to determine the results of incident angle and polarization of source signal. The design process finds a shape and size for a specific phase and synthesizes a specific point in the configuration to choose element geometry dimensions. While the plot 1904 gives the phase, the plot 1906 gives a measure of the quality of the reflection and identifies any loss. In plot 1906 there is a high loss area identified at size A. The design process may analyze each cell in the reflectarray and in this way the reflectarray may have a variety of sized cells. These synthesized results are mapped to a physical implementation or phase to geometry. The elements may have a quasi-periodic configuration with shapes that gradually change, such as illustrated in the reflectarray 800 of FIG. 8 and reflectarray 900 of FIG. 9. After determining a size for to achieve phase, the element structure is determined. The completed reflectarray provides a phase distribution which may be verified to ensure the design.

Once the shape and size of the reflectarray are determined, the next two steps can be performed sequentially or in parallel: the phase distribution on the reflectarray aperture is determined according to the link budget (1606) and the reflectarray cells are designed, i.e., their shape, size, and material are selected (1608). The reflection phase, $\varphi_r$, for an $i^{th}$ cell in the reflectarray (cell 1804 in reflectarray 1800) is calculated as follows:

$$\varphi_r = k_0(d_i - (x_i \cos \varphi_0 + y_i \sin \varphi_0) \sin \theta_0) \pm 2N\pi \quad \text{(Eq. 1)}$$

wherein $k_0$ is the free space propagation constant, $d_i$ is the distance from the BS to the $i^{th}$ cell in the reflectarray, N is an integer for phase wrapping, and $\varphi_0$ and $\theta_0$ are the azimuth and elevation angles for the target reflection point. The calculation identifies a desired or required reflection phase $\varphi_r$ by the $i^{th}$ element on the x-y plane to point a focused beam to ($\varphi_0, \theta_0$). $d_i$ is the distance from the phase center of the BS to the center of the $i^{th}$ cell, and N is an integer. This formula and equation may further include weights to adapt and adjust specific cells or sets of cells. In some examples, a reflectarray may include multiple subarrays allowing redirection of a received signal in more than one direction, frequency, and so forth.

The last step in the design process is to then design the reflector elements in each cell, such as their size, shape, type, and so forth, to achieve the phase distribution on the reflectarray aperture (1610). The design process steps 1604 to 1610 may be iterated as needed to adjust parameters such as by weighting some of the cells, adding a tapering formulation, and so forth. When all cells are complete (1612) processing verifies performance (1610), else the process returns to design a next cell (1606).

Figure 20:
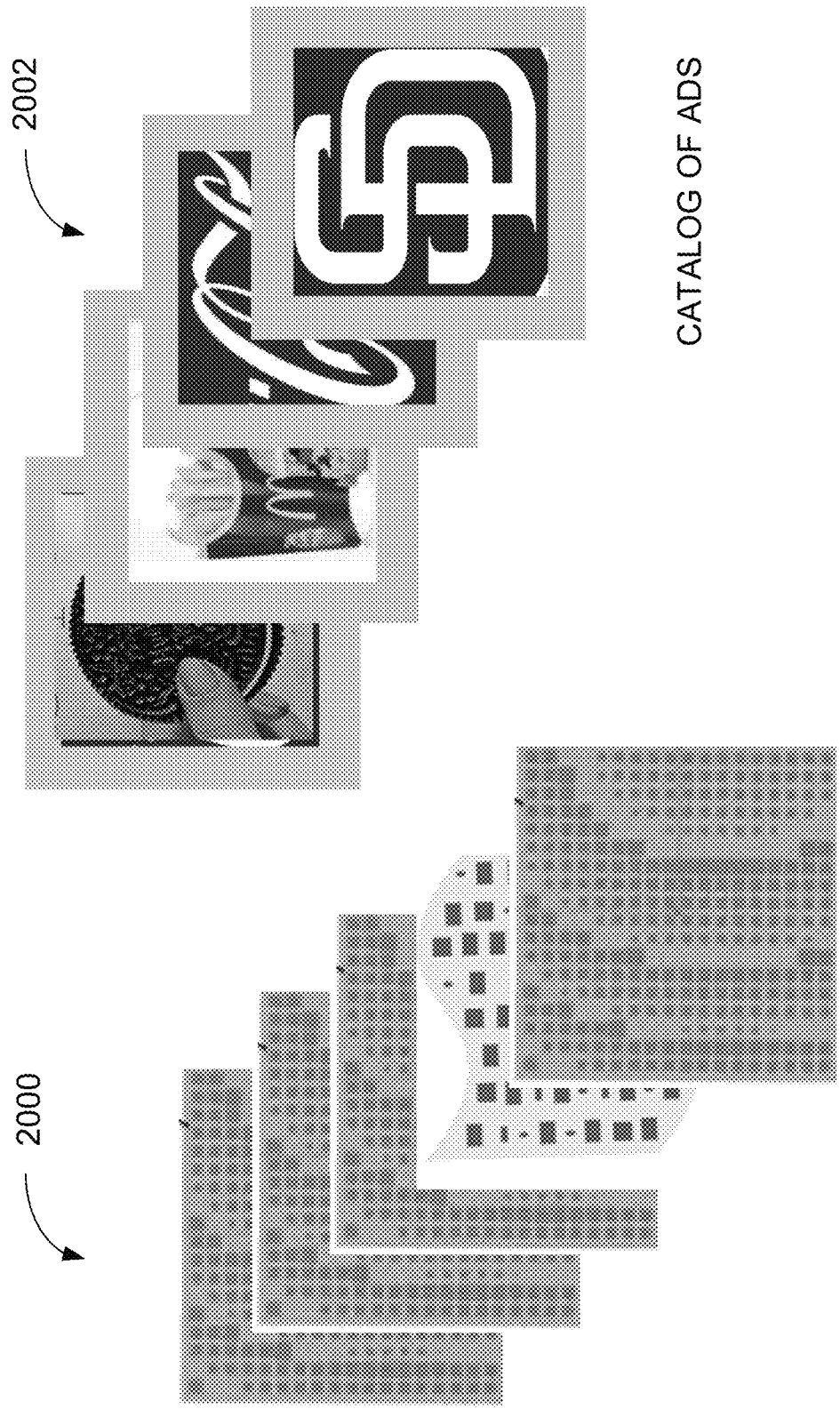
FIG. 20 illustrates a library of reflectarrays and a library of removable covers according to various examples.

FIG. 19 illustrates a reflectarray cell 1900 with a reflector element 1902, such as a MTS reflector element, to achieve the phase and amplitude distribution illustrated in graphs 1904 and 1906, respectively. Plot 1904 illustrates phase of a reflected wave as a function of the dimension or size of the radiating patch, such as element 1902. This is illustrated for a first incident angle received at element 1902. The Plot 1906 illustrates amplitude of a reflected wave as a function of the dimension or size of the radiating patch, such as element 1902. This is illustrated for a second incident angle. her Once the reflectarray is designed, it is ready for placement and operation to significantly boost the wireless coverage and performance of any 5G application, whether indoors or outdoors. Note that even after the design is completed and the reflectarray is manufactured and placed in an environment to enable high performance 5G applications, the reflectarray can still be adjusted with the use of say rotation mechanisms as illustrated in FIGS. 10 to 12 or in a stackable configuration as illustrated in FIG. 14. The reflectarray can also be manufactured with a bendable PCB for easy placement in structures such as light posts (see FIGS. 5 and 13), be made portable as in FIG. 15, or have removable cover(s) with the option to display ads, promotions or messages to UE and others in the 5G environment (see FIG. 8). The 5G operators can have access to a catalog of reflectarrays 2000 and covers 2002 as illustrated in FIG. 20, or they can request custom made designs of reflectarrays and covers if desired. In addition to many configurations, the reflectarrays disclosed herein are able to generate narrow or broad beams as desired, e.g., narrow in azimuth and broad in elevation, at different frequencies, such as single, dual, multi-band or broadband), with different materials, and so forth. The reflectarrays can reach a wide range of directions and locations in any 5G environment. These reflectarrays are low cost, easy to manufacture and set up, and may be self-calibrated without requiring a 5G operator to adjust their operation. They may be passive or active and achieve MIMO like gains and enrich the multipath environment. It is appreciated that these reflectarrays effectively enable the desired performance and high-speed data communications promises of 5G.

In some applications, it may be desirable for a MTS based reflectarray to generate a plurality of RF beams to provide a broader coverage area of the reflected RF signal. In various examples, a MTS based reflectarray may be designed such that it generates a plurality of RF beams, rather than a single RF beam.

In some applications, it may be desirable for a MTS based reflectarray to radiate electromagnetic (EM) energy at a plurality of frequencies or a plurality of frequency bands). In various examples, a MTS based reflectarray may be designed such that it generates at least one RF beam comprising a plurality of frequencies, rather than a single RF beam comprising only a single frequency or a single frequency band as in previously discussed examples. As used in these descriptions herein, a frequency may indicate a range of frequencies.

Figure 21:
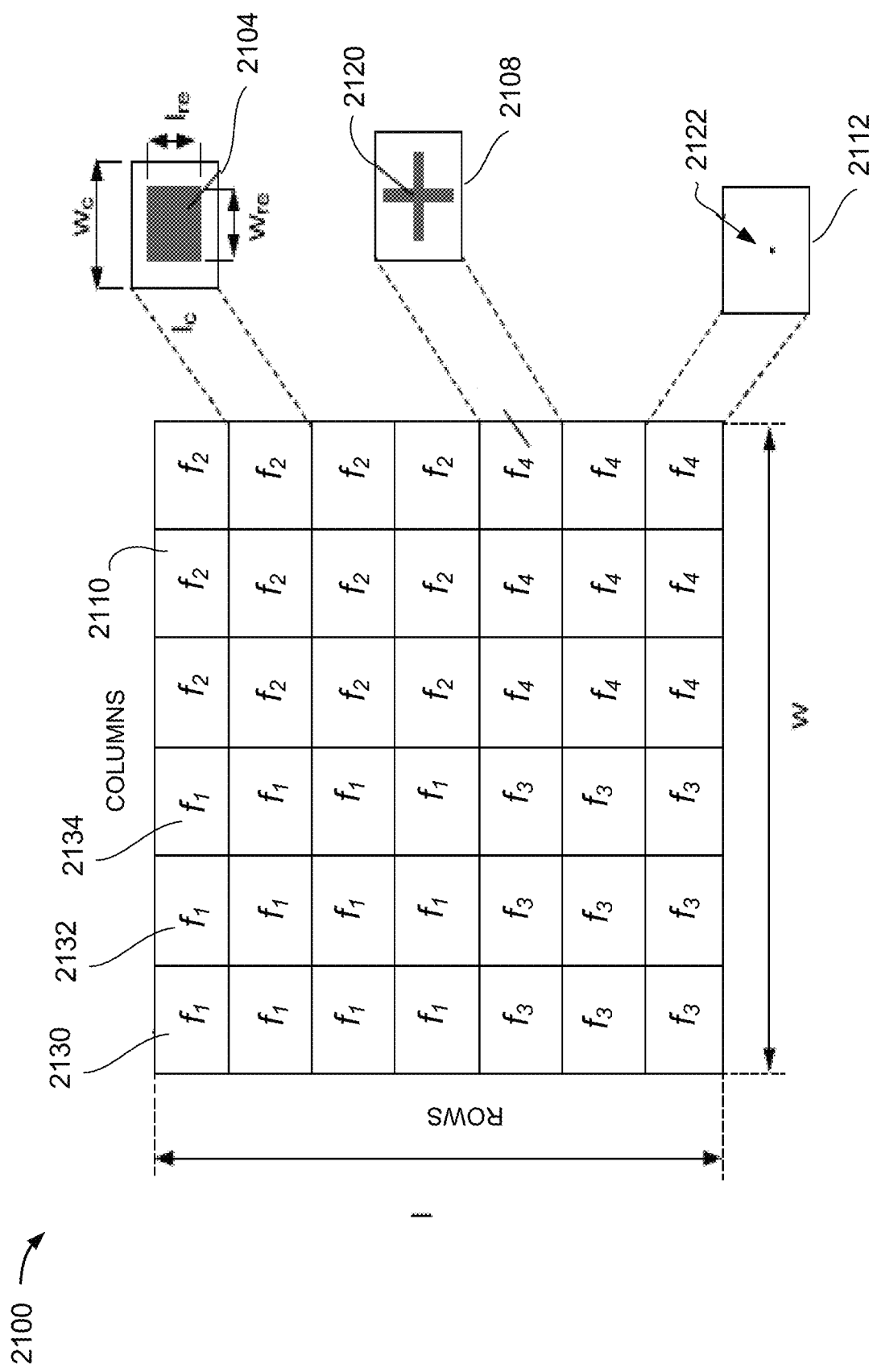
FIG. 21 is a schematic diagram of a MTS reflectarray, where each of the reflector elements of the MTS cells is configured to radiate electromagnetic (EM) energy at a specific frequency, in accordance to various examples.

FIGS. 21 to 26 illustrate MTS reflectarrays 2100, 2200, 3600, 2400, 2500 that are designed to radiate EM energy at a plurality of different frequencies. Alternate embodiments may implement reflective elements having desired properties to achieve reflection of the 5G wireless signals. In particular, FIG. 21 is a schematic diagram of a MTS reflectarray 2100, where each of the reflector elements of the MTS cells, such as 2110, is configured to radiate EM energy at a specific frequency ($f_1, f_2, f_3, f_4$), in accordance to various examples. In this figure, the MTS reflectarray 2100 is rectangular in shape, and has a length l and a width w. Although the MTS reflectarray 2100 is depicted to be rectangular in shape, the MTS reflectarray 2100 may be designed to be of a different shape, such as square, hexagon, trapezoid, custom, and so forth.

The MTS reflectarray 2100 has a matrix of MTS cells where each MTS cell has a cell width $w_c$ and a cell length $l_c$. Each MTS cell, such as cell 2110, is a reflector element. Various different types of reflector elements may be employed for the reflector elements of the MTS cells including a variety of cells 2104, 2108 and 2112, and may include others The MTS reflector element 2104 has a reflector element width $w_{re}$ and a reflector element length $l_{re}$. The dipole element 2108 has a reflective structure 2120 positioned therein. A miniature reflector element 2112 includes a small reflective element 2122. Additionally, each of the MTS cells may include a unique reflector element, wherein each structure is a different type of reflector element than at least one other structure.

Each of the reflector elements is designed to radiate EM energy at a specific frequency, wherein a grouping or combination of cells may each radiate at a frequency, such as frequency $f_1$ at which cell 2130 reflects incident waves. In some examples multiple cells are designed to work together to reflect a frequency, such as where cells 2130, 2132, 2134 in combination reflect incident waves at frequency $f_1$, such that the reflector elements together radiate at least one RF beam at one frequency. As indicated in FIG. 21, the reflectarray 2100 reflects incident waves at several frequencies. The specific frequency or frequency band, such as gigahertz (GHz) frequency band, ($f_1, f_2, f_3, f_4$) that each reflector element is designed to radiate is denoted in the figure on its respective MTS cell. As such, for this example, the reflector elements of the forty-two (42) total MTS cells, twelve (12)

of the reflector elements are designed to radiate EM energy at the $f_1$ frequency, twelve (12) of the reflector elements are designed to radiate EM energy at the $f_2$ frequency, nine (9) of the reflector elements are designed to radiate EM energy at the $f_3$ frequency, and nine (9) of the reflector elements are designed to radiate EM energy at the $f_4$ frequency.

In one or more examples, the reflector elements may radiate EM energy at different frequencies in different combinations than as illustrated in this figure. In addition, the reflector elements may be designed to radiate EM energy at more or less than four frequencies ($f_1$, $f_2$, $f_3$, $f_4$) as is illustrated. In one or more examples, one or more of the frequency bands ($f_1$, $f_2$, $f_3$, $f_4$) may be frequency bands utilized by 5G cellular communications. In some embodiments the reflector elements are frequency-selective structures that reflect signals in one frequency range but not at other ranges.

During operation of the MTS reflectarray 2100, a source, such as BS 100 of FIG. 1, transmits a RF signal that is received as an incident EM wave at the MTS reflectarray 2100. In a beamforming wireless system, such as a 5G system, the source transmits a directed signal to a reflectarray, wherein the source and the reflectarray have a fixed or known spatial arrangement. The reflector elements, MTS reflector element 2104, dipole element 2108, and/or miniature reflector element 2112, of the MTS reflectarray 2100 receive and reflect the RF signal to reflect at least one RF beam.

It should be noted that, each of the reflector elements of the MTS reflectarray 2100 are designed and configured to have a respective reflection phase to generate one or more RF beams. In some examples, each of the reflector elements of the MTS reflectarray 2100 may be designed and configured to have a respective reflection phase such that all of the reflector elements radiate in unison together to generate a single RF beam, wherein the reflections effectively radiate together to form a sum pattern beam. In other examples, each of the reflector elements of the MTS reflectarray 2100 may be designed and configured to have a respective reflection phase such that each of the reflector elements reflects a single respective RF beam.

In one or more examples, at least some of the MTS cells of the MTS reflectarray 2100 may be grouped together in at least one grouping of MTS cells, where the reflector elements of each grouping of MTS cells radiate EM energy at a single RF beam per grouping. For these examples, the reflector elements of each grouping of MTS cells may be designed and configured to have a respective reflection phase such that the reflector elements in each grouping of MTS cells reflect/redirect/radiate in unison together to generate a RF beam. For example, the MTS cells comprising the twelve (12) reflector elements which are designed to radiate EM energy at the $f_1$ frequency, may be designed and configured to have a respective reflection phase such that these reflector elements radiate in unison together to generate a single RF beam, which would radiate at the $f_1$ frequency.

In some examples, some of the reflector elements of the MTS reflectarray 2100 may be designed and configured to have a respective reflection phase such that these reflector elements each generate a respective RF beam; and the remaining of the reflector elements of the MTS reflectarray 2100 may be grouped together in at least one grouping, where the reflector elements of each grouping may be designed and configured to have a respective reflection phase such that the reflector elements radiate in unison together to generate a single RF beam per grouping. As such, each RF beam radiated from the MTS reflectarray 2100 is generated from at least one of the MTS reflector elements.

FIG. 21 illustrates examples of wireless infrastructure in a wireless system having beamforming that directs signals toward a user, device, or infrastructure element. The positioning of wireless infrastructure elements is known or fixed, such that the spatial arrangement and configuration determines the design of the infrastructure element. In these examples, the infrastructure element is a reflectarray to receive signals from a source in the wireless system and redirect or reflect the incident wave toward a target area. Typically, the target area is a NLOS area to which the source does not have direct access. The reflectarray then enables the system to reach these NLOS or other areas at reduced cost and complexity. Without the reflectarray, the system would either have limited coverage or would require additional radio transmitters coupled to a wireless system backhaul, which dramatically increases the cost, maintenance, and complexity of a system.

Continuing with FIG. 21, the reflectarray 2100 may be arranged in a variety of configurations and using a variety of reflector elements. The reflectarray 2100 is designed to achieve frequency responses as indicated for various frequency signals according to the individual reflector elements and their configuration. There are a variety of applications that may incorporate such a reflectarray structure and are not limited to cellular of 5G system. In some applications, an incident signal at a first frequency received at the reflectarray is to be directed in a first direction, and an incident signal at a second frequency received at the reflectarray is to be directed in a second direction.

Figure 22:
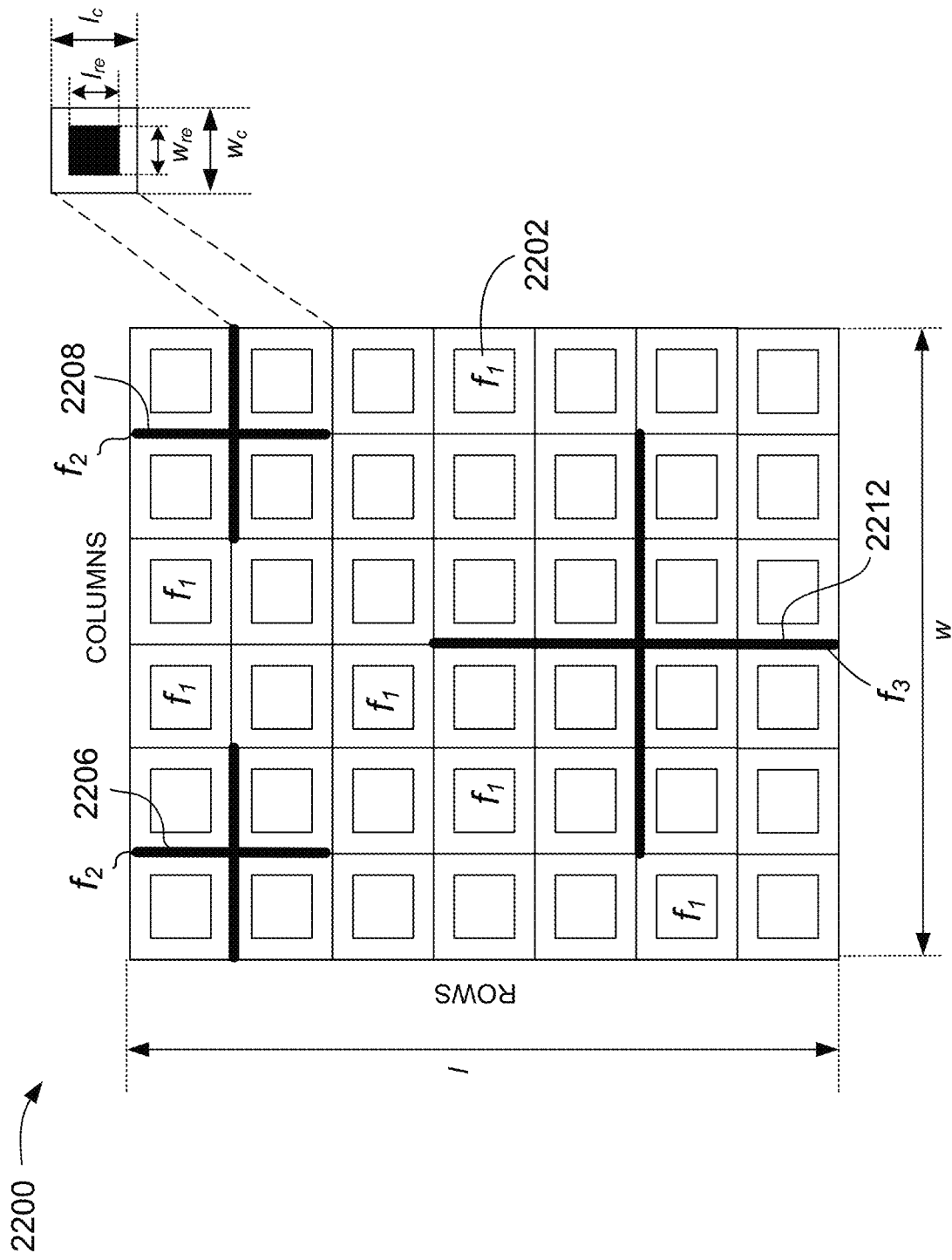
FIG. 22 is a schematic diagram of a MTS reflectarray, where some reflector elements are interleaved between other reflector elements, in accordance to various examples.
Figure 23:
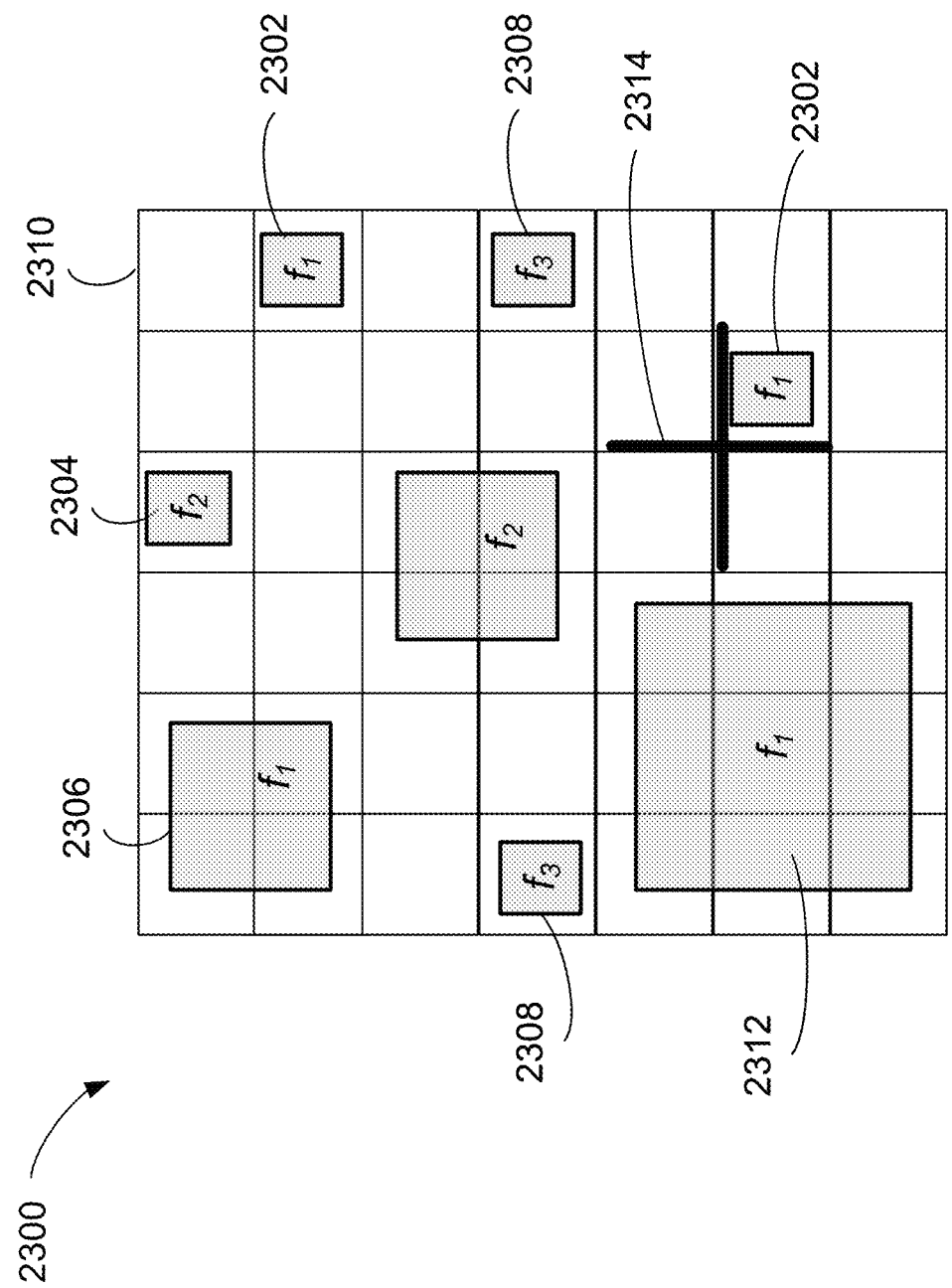
FIG. 23 is a schematic diagram of a MTS reflectarray comprising various different types and sizes of reflector elements, which are each configured to radiate EM energy at a specific frequency, in accordance to various examples.

FIG. 22 is a schematic diagram of a MTS reflectarray 2200, where some reflector elements are interleaved between other reflector elements, in accordance with various examples. The reflectarray 2200 of FIG. 22. Similar to the MTS reflectarray 2100 of FIG. 21, the MTS reflectarray 2200 of FIG. 22 is rectangular in shape and includes a matrix of MTS cells, such as cell 2202. In addition, each MTS cell comprises a respective reflector element 2202, such as a MTS reflector element 2204. For the example of FIG. 22, each of the reflector elements 2202 of the MTS cells 2210 is designed to radiate EM energy at a specific frequency.

The MTS reflectarray 2200 is also illustrated to have several reflector elements in the form of dipole elements 2206, 2208, 2212 of various sizes. These dipole elements 2206, 2208, 2212 are interleaved between the other reflector elements 2202, which are in the form of MTS reflector elements 2204. The interleaving of the dipole elements 2206, 2208, 2212 between other reflector elements 2202 helps to maximize the number of reflector elements that may be designed and configured on the MTS reflectarray 2200. In this example, dipole elements 2206, 2208 are designed to radiate EM energy at a specific frequency $f_2$. And, dipole element 2212 is designed to radiate EM energy at a different specific frequency, such as at the $f_3$ frequency.

In some applications, it may be desirable for some of the reflector elements to be of different sizes than other reflector elements. Larger sized reflector elements may be designed to radiate higher power or higher EIRP RF beams than reflector elements of smaller sizes. In the example of FIG. 22, it may be desirable to generate a RF beam at the $f_3$ frequency to be of a higher power or higher EIRP than RF beams generated at the $f_1$ and $f_2$ frequencies. And, it may be desirable to generate a RF beam at the $f_2$ frequency to be of a higher power or higher EIRP than RF beams generated at the $f_1$ frequency. As such, since dipole element 2212 is larger than dipole elements 2206, 2208 and reflector elements 2202, dipole element 2212, which is designed to radiate at the $f_3$ frequency, may be designed to generate a higher power RF beam than the RF beams generated by dipole elements 2206, 2208 which are designed to radiate at the $f_2$ frequency and reflector elements 2202 which are designed to radiate at the $f_1$ frequency. Also, since dipole elements 2206, 2208 are larger than reflector elements 2202, dipole elements 2206, 2208 which are designed to radiate at the $f_2$ frequency may be designed to generate higher power RF beams than the RF beams generated by reflector elements 2202 which are designed to radiate at the $f_1$ frequency.

During operation of the MTS reflectarray 2200, a source, such as BS 100 of FIG. 1, transmits a RF signal which is an incident EM wave received at the MTS reflectarray 2200. The reflector elements, such as MTS reflector elements 2202 and dipole elements 2206, 2208, 2212, of the MTS reflectarray 2200 receive and reflect the RF signal to generate one or more RF beams.

In one or more examples, the reflector elements may radiate EM energy at different frequencies, in different combinations, than as illustrated in FIG. 22. In addition, the reflector elements may be designed to radiate EM energy at more or less than three frequencies, $f_1$, $f_2$, $f_3$, as is illustrated. Additionally, the reflector elements may be of different reflector element types, in different combinations, and of different sizes than as illustrated. In addition, each of the reflector elements of the MTS reflectarray 2200 may be designed and configured to have a respective reflection phase to generate one or more RF beams.

FIG. 36 is a schematic diagram of a MTS reflectarray 3600 comprising various different types and sizes of reflector elements, which are each configured to radiate EM energy at a specific frequency ($f_1$, $f_2$, $f_3$, $f_4$), in accordance to various examples. The reflectarray 3600 of FIG. 36 is structured similarly to the MTS reflectarray 2100 of FIG. 21 and the MTS reflectarray 2200 of FIG. 22. The MTS reflectarray 3600 is rectangular in shape and comprises a matrix of MTS cells, such as cell 3610.

The MTS reflectarray 3600 comprises a plurality of reflector elements in the form of MTS reflector elements 3602, 3604, 3606, 3608, 3612, 3616. The MTS reflector elements 3602, 3604, 3606, 3608, 3612, 3616 are of various sizes and are designed to radiate EM energy at various different frequencies. For the example of FIG. 36, MTS reflector elements 3602, 3606, 3612 are designed to radiate EM energy at the $f_1$ frequency, MTS reflector elements 3604, 3616 are designed to radiate EM energy at the $f_2$ frequency, and MTS reflector elements 3608 are designed to radiate EM energy at the $f_3$ frequency.

It should be noted that in some applications, it may be desirable for some of the reflector elements to be of different sizes than other reflector elements. Larger sized reflector elements may be designed to radiate higher power or higher EIRP RF beams than smaller sized reflector elements. In this example, MTS reflector element 3612 is designed to be larger in size than MTS reflector elements 3602, 3604, 3606, 3608, 3616. And, MTS reflector elements 3606, 3616 are designed to be larger in size than MTS reflector elements 3602, 3604, 3608. As such, the MTS reflector element 3612 may be designed to generate a higher power RF beam than the RF beams generated by the MTS reflector elements 3602, 3604, 3606, 3608, 3616. And, the MTS reflector elements 3606, 3616 may be designed to generate higher power RF beams than the RF beams generated by the MTS reflector elements 3602, 3604, 3608.

In this example, the MTS reflectarray 3600 also comprises dipole element 3614, which is designed to radiate at the $f_4$ frequency. This dipole element 3614 is interleaved between some of the MTS cells 3610, where one of these MTS cells 3610 comprises MTS reflector element 3602, which is designed to radiate at the $f_1$ frequency. The dipole element 3614 is interleaved between MTS cells 3610 to maximize the amount of available space to accommodate reflector elements on the MTS reflectarray 3600.

During operation of the MTS reflectarray 3600, a source transmits a RF signal towards the MTS reflectarray 3600. The reflector elements 3602, 3604, 3606, 3608, 3612, 3616 and dipole element 3614 of the MTS reflectarray 3600 receive and reflect the RF signal to generate one or more RF beams.

The reflector elements of the MTS reflectarray 3600 may radiate EM energy at different frequencies, in different combinations, than as illustrated in FIG. 36. The reflector elements may be designed to radiate EM energy at more or less than three frequencies ($f_1$, $f_2$, $f_3$, $f_4$) as is illustrated. Additionally, the reflector elements may be of different reflector element types, reflector element 3602, 3604, 3606, 3608, 3612, 3616, a dipole element 3614, and/or a miniature reflector element 2212, in different combinations, and of different sizes than as illustrated.

It should be noted that in some applications, it may be desirable for the MTS reflectarray to be designed such that there is irregular spacing between the reflector elements. Unlike the reflectarray 2100 of FIG. 21 and the reflectarray 2200 of FIG. 22, not all the MTS cells 3610 of the MTS reflectarray 3600 of FIG. 36 comprise a respective reflector element. Since some of the MTS cells 3610 of the MTS reflectarray 3600 do not comprise a reflector element, the reflector elements are irregularly spaced from one other.

Irregular spacing between the reflector elements on the MTS reflectarray may be beneficial for the design of reflector elements to radiate RF beams of different powers or different EIRP and/or for the design of reflector elements on the MTS reflectarray to be grouped into groupings to radiate in unison together to generate a single RF beam per grouping. For example, some of the reflector elements may be designed to be grouped together to radiate a single narrow RF beam of a power or EIRP. For this design, it may be beneficial to have these reflector elements grouped closer together with each other on the MTS reflectarray than the other reflector elements on the MTS reflectarray. As such, irregular spacing of the reflector elements can allow for the reflector elements to be designed and configured to radiate RF beams of different powers or different EIRP as well as allow for reflector elements grouped in groupings to be designed and configured to radiate in unison to generate a single RF beam per grouping.

Figure 24:
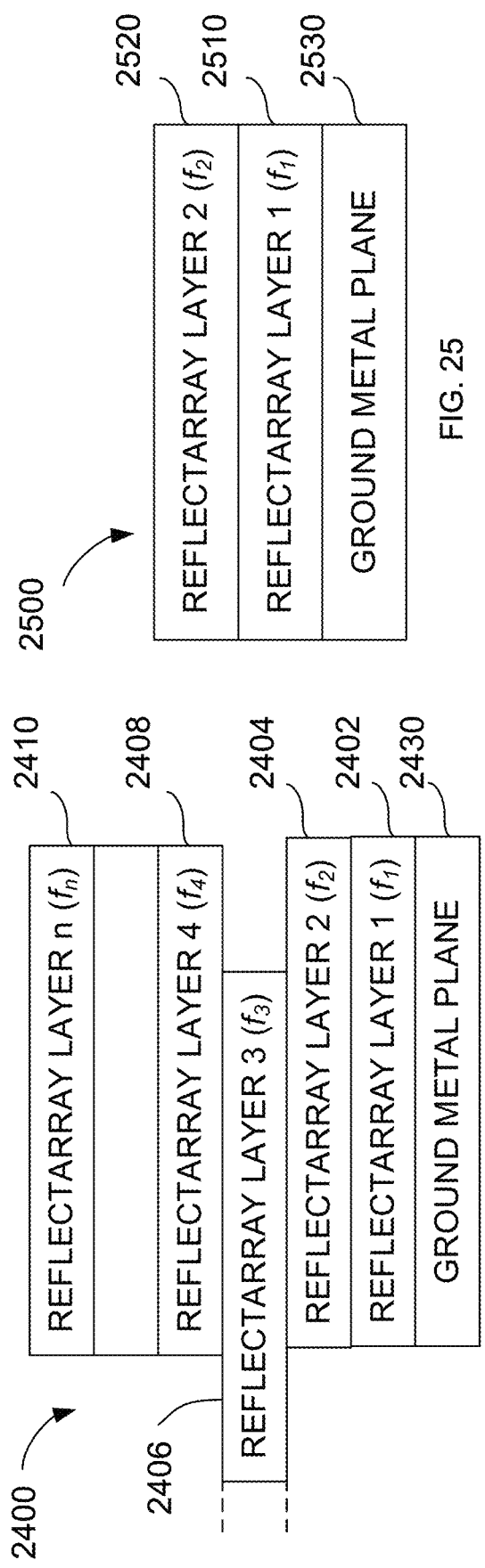
FIG. 24 is a schematic diagram of a stackable, slidable MTS reflectarray having multiple reflectarray layers, which are each configured to radiate a specific frequency, in accordance to various examples.

FIG. 24 is a schematic diagram of a stackable, slidable MTS reflectarray 2400 having multiple reflectarray layers 2402, 2404, 2406, 2408, 2410, which are each configured to radiate EM energy at a specific frequency ($f_1$, $f_2$, $f_3$, $f_4$, ... $f_n$), in accordance to various examples. In this figure, the MTS reflectarray 2400 comprises a stack of reflectarray layers 2402, 2404, 2406, 2408, 2410 configured or disposed on a ground metal plane 2430. Each of the reflectarray layers 2402, 2404, 2406, 2408, 2410 of the stack comprises a plurality of reflector elements. Each reflectarray layer 2402, 2404, 2406, 2408, 2410 may employ various different types of reflector elements, such as MTS reflector elements 2104, dipole elements 2108, and miniature reflector elements 2112 of FIG. 21, sizes of reflector elements, and configurations of the reflector elements. In one or more examples, the MTS reflectarray 2400 may comprise more or less than the number of reflectarray layers 2402, 2404, 2406, 2408, 2410 as illustrated in FIG. 24.

The reflectarray layers 2402, 2404, 2406, 2408, 2410 are manufactured from materials that will allow for the transmission of RF signals or RF beams through each other. In one or more examples, a given reflectarray layer 2402, 2404, 2406, 2408, 2410 may be a transparent layer that is able to radiate RF signals at a given frequency. Each reflectarray layer 2402, 2404, 2406, 2408, 2410 in the stack may be designed to radiate signals at a different frequency ($f_1$, $f_2$, $f_3$, $f_4$, ... $f_n$).

In particular, the reflector elements of each reflectarray layer 2402, 2404, 2406, 2408, 2410 are designed and configured such that the reflector elements of each reflectarray layer 2402, 2404, 2406, 2408, 2410 radiate at least one RF beam of a specific frequency ($f_1$, $f_2$, $f_3$, $f_4$, ... $f_n$). For example, the reflector elements of reflectarray layer 1 2402 radiate at least one RF beam at the $f_1$ frequency, the reflector elements of reflectarray layer 2 2404 radiate at least one RF beam at the $f_2$ frequency, the reflector elements of reflectarray layer 3 2406 radiate at least one RF beam at the $f_3$ frequency, the reflector elements of reflectarray layer 4 2408 radiate at least one RF beam at the $f_4$ frequency, and the reflector elements of reflectarray layer n 2410 radiate at least one RF beam at the $f_n$ frequency.

For a given application, it may be desirable to customize the MTS reflectarray 2400 to radiate specific frequencies. The stack may be customized by the removal or addition of at least one reflectarray layer. As such, at any given time, a network operator may remove a reflectarray layer, such as reflectarray layer 2406, which radiates at frequency $f_3$, from the stack, while the other reflectarray layers, such as reflectarray layers 2402, 2404, 2408, 2410, may stay in their place or may be moved to accommodate the displacement of the reflectarray layer, reflectarray layer 2406, that was removed. Note that after the removal of the reflectarray layer, reflectarray layer 2406, from the stack, the MTS reflectarray 2400 will no longer generate RF beams at the specific frequency, $f_3$ frequency, of the removed reflectarray layer 2406.

Figure 25:
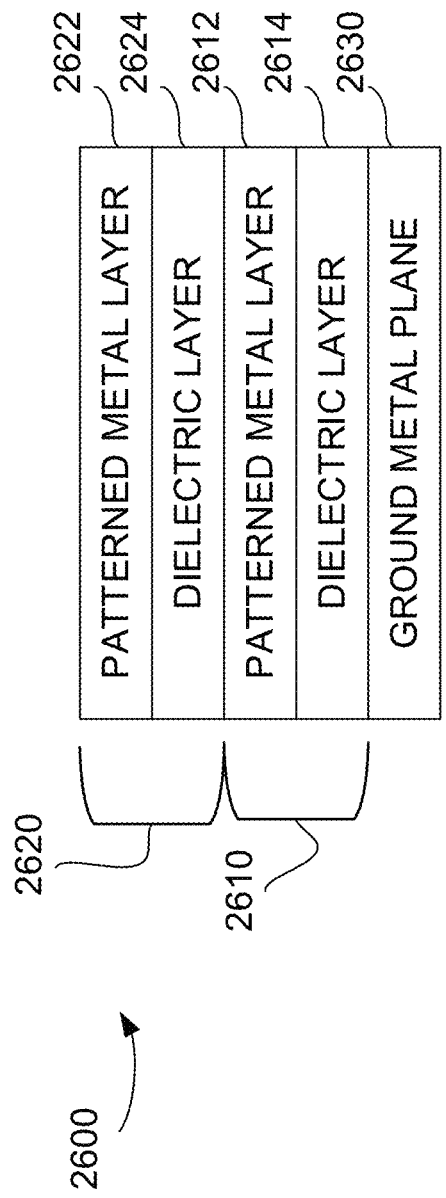
FIG. 25 is a schematic diagram of a MTS reflectarray having two reflectarray layers, which are each configured to radiate EM energy at a specific frequency, in accordance to various examples.

FIG. 25 is a schematic diagram of a MTS reflectarray 2500 having two reflectarray layers 2510, 2520, which are each configured to radiate EM energy at a specific frequency ($f_1$, $f_2$), in accordance to various examples. In this figure, the MTS reflectarray 2500 comprises a stack of reflectarray layers 2510, 2520 configured or disposed on a ground metal plane 2530. In one or more examples, the MTS reflectarray 2500 may be manufactured to comprise more or less than two reflectarray layers 2510, 2520 as is illustrated.

Each of the reflectarray layers 2510, 2520 comprises a plurality of reflector elements. Various types of reflector elements, sizes of reflector elements, and configurations of the reflector elements may be employed. The reflector elements of each reflectarray layer 2510, 2520 are designed and configured such that the reflector elements of each reflectarray layer 2510, 2520 radiate at least one RF beam at a specific frequency ($f_1$, $f_2$). The reflector elements of reflectarray layer 1 2510 radiate at least one RF beam at the $f_1$ frequency, and the reflector elements of reflectarray layer 2 2520 radiate at least one RF beam at the $f_2$ frequency.

Figure 26:
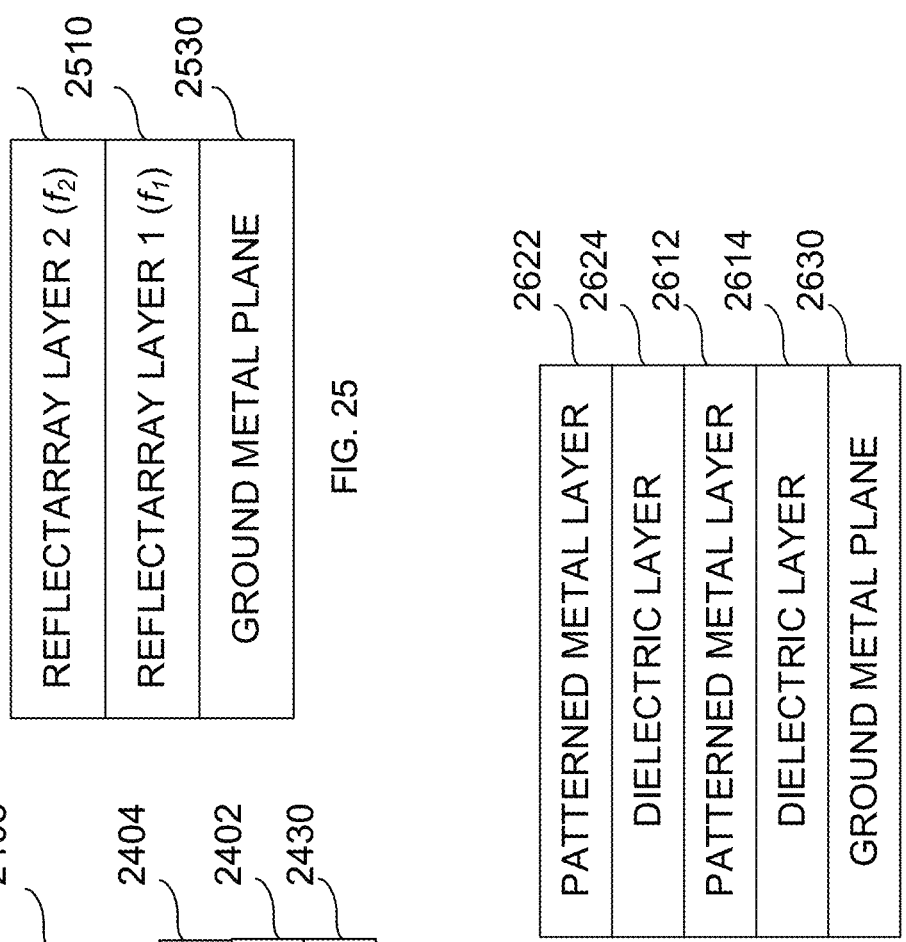
FIG. 26 is a diagram of the MTS reflectarray of FIG. 25 illustrating details of each of the reflectarray layers, in accordance to various examples.

FIG. 26 is a diagram of the MTS reflectarray 2500 of FIG. 25 illustrating details of each of the reflectarray layers 2510, 2520, in accordance to various examples. In this figure, the stack of reflectarray layers 2510, 2520 is configured or disposed on the ground metal plane 2530. Each reflectarray layer 2510, 2520 comprises a patterned metal layer 2612, 2622 on a dielectric layer 2614, 2624 comprising a dielectric material.

The reflector elements of the reflectarray 2500 may be etched or deposited into a metal material to form the patterned metal layers 2612, 2622 of each of the reflectarray layers 2510, 2520. In one or more examples, the metal ground plane 2530 and the patterned metal layers 2612, 2622 are copper layers surrounding a composite dielectric material of the dielectric layers 2614, 2624. In other examples, other materials may be employed for the reflectarray 2500, depending on the desired performance of a given application, such as a beamforming directed application, for example, 5G wireless.

Figure 27:
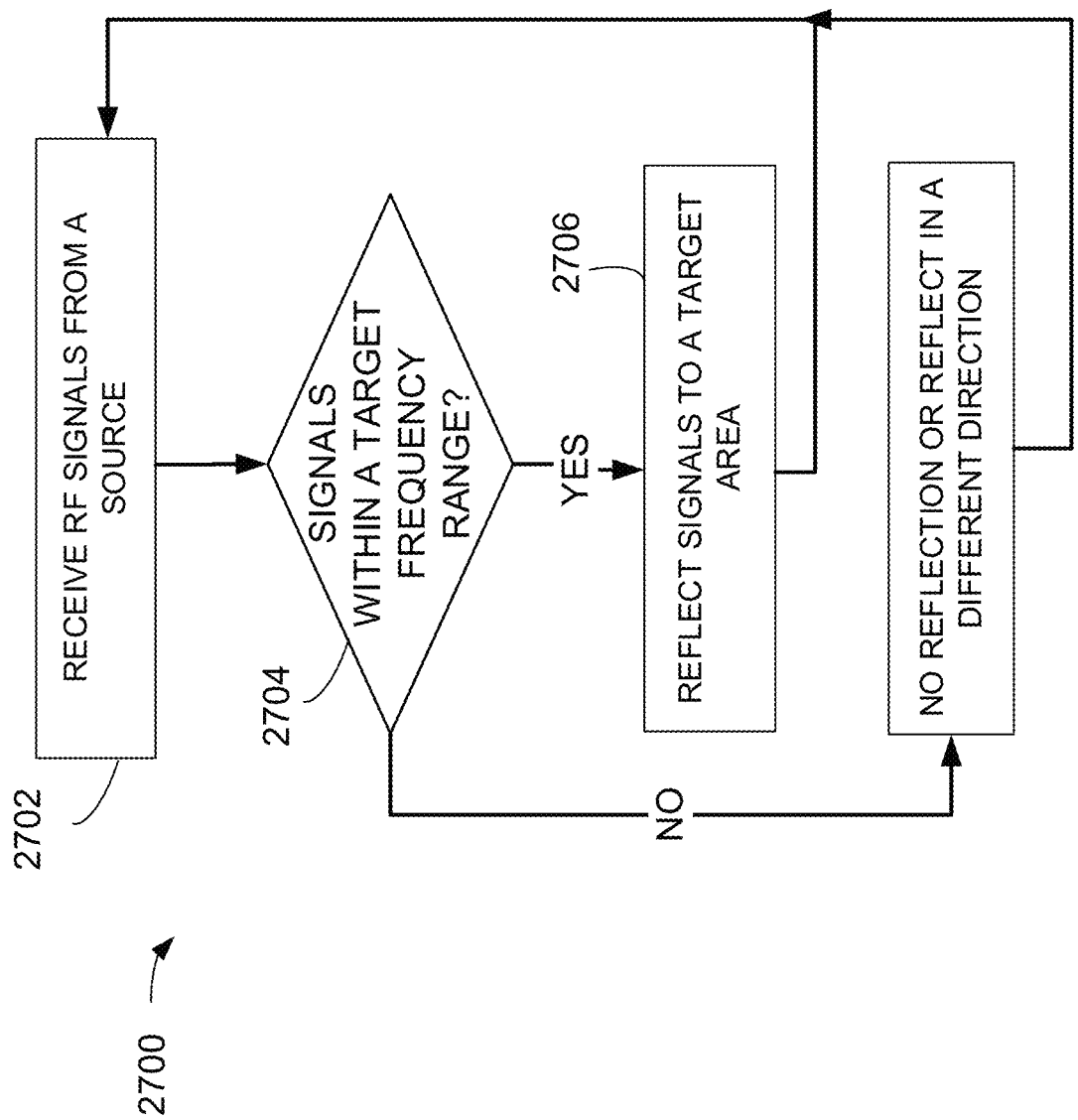
FIG. 27 illustrates a flow chart illustrating the method for operating the MTS reflectarray according to various examples.

FIG. 27 illustrates a flow chart illustrating the method 2700 for operating the MTS reflectarray according to various examples. A plurality of reflector elements on a MTS based reflectarray receive RF signals from a source (2702). Then, the plurality of reflector elements reflect the RF signal to generate at least one RF beam. If the received signals are in a target frequency range (2704), the reflector elements reflect, also referred to as radiating or redirecting in this description, EM energy (2706). Else there is no reflection or a reflection in a different direction. The at a plurality of frequencies 2730 within the target frequency range. Then, the method 2700 ends, 2740.

The present inventions are applicable to the Internet of Things (IoT), machine-to-machine (M2M), home security and other wireless communication applications. M2M is communication, direct or indirect, between devices using a communication channel and may form a web of connections including wired and wireless. M2M communication is used in many applications, and continues to grow, from industrial instrumentation, agriculture monitoring and control, medical procedures, robotics, home networks, and so much more. These systems enable sensors and meter data collection, data recordings and storage, shopping and inventory, temperature, and soil science, and so forth. A M2M system includes sophisticated computer programs that at autonomously on behalf of user across open and distributed environments, wherein these programs are referred to a "M2M agents." M2M networks are multi-agent systems (MAS) of coupled networks of M2M agents interacting to solve problems that may be beyond the individual capacities or knowledge of each problem solver; the MAS is a loose ecosystem of various communicating devices from simple sensors to advanced and complex artificial intelligence (AI) systems or machine learning modules. These systems may be centralized or decentralized and may work together with other networks. This is leading to a machine economy. Core to these networks is flexibility and adaptation to a variety of conditions and the ability to change with technology. The present inventions provide methods and apparatuses to expand the reach of MAS networks and individual M2M agents.

Figure 28:
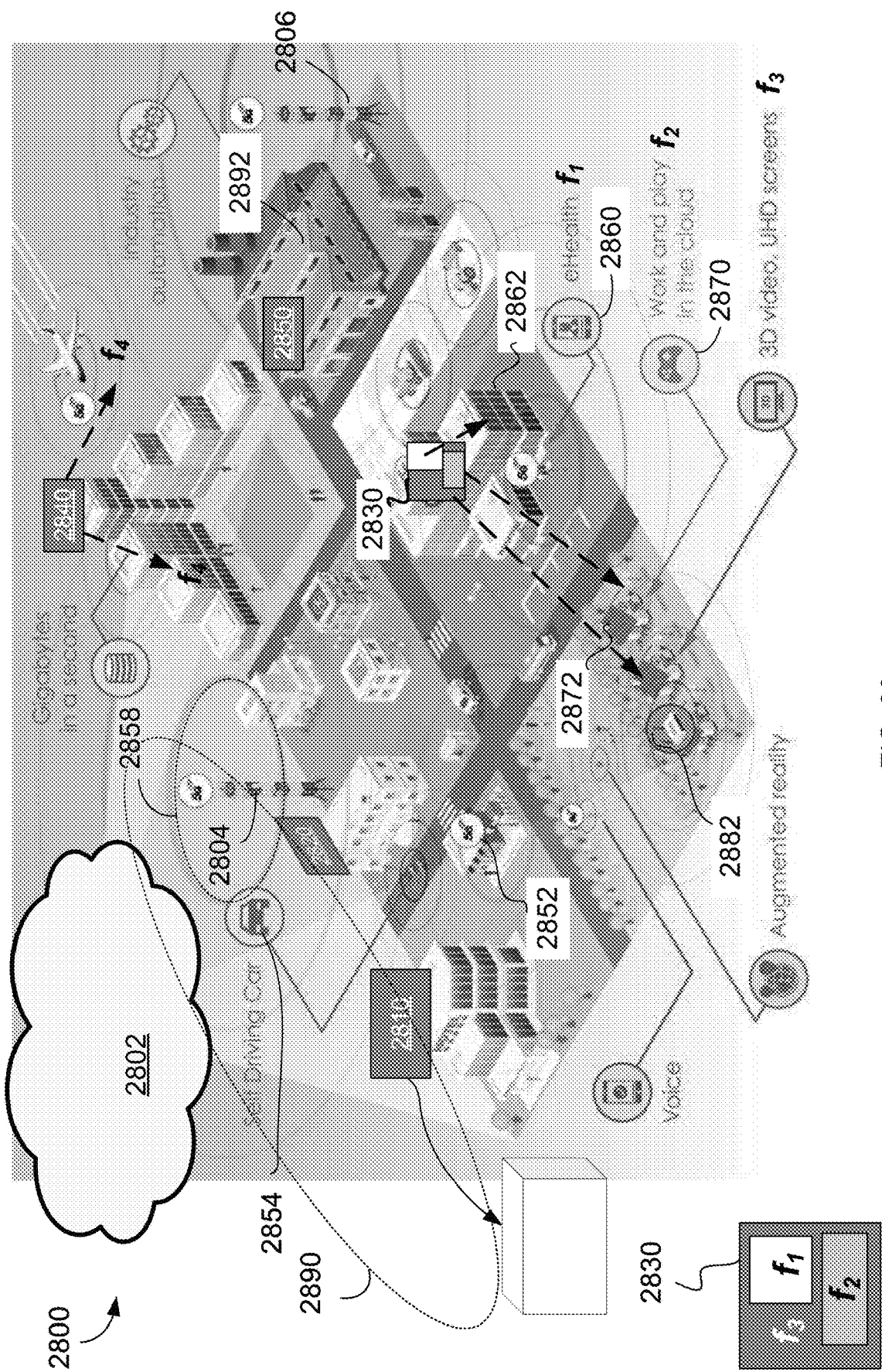
FIG. 28 illustrates wireless infrastructure elements in a machine-to-machine system, according to embodiments of the present invention.

FIG. 28 illustrates an M2M environment 2800 having communications such as automotive service station 2852 to vehicle 2854. The M2M environment 2800 includes IoT communications, such as from vehicle 2854 to hospital 2862. Some of the infrastructure elements, components and devices communicate through a cloud network 2802 and/or beamforming wireless BSs 2804, 2806. As illustrates, there are many devices and machines involved in communications within environment 2800. To extend the coverage of sources wireless infrastructure elements are positioned at strategic locations. Some of these elements are designed and placed to cover direct communications, such as from hospital 2862 to modular ehealth unit 2860. Still others are positioned and designed to cover a target area, such as area 2858 within which a vehicle may communicate with BS 2804. A coverage area 2858 is supported from BS 2804, and then Reflectarray 2820 extends the coverage area to target area 2890.

Reflectarrays are positioned on buildings to provide coverage in target areas, such as NLOS areas. In this environment 2800 there are reflectarrays 2810, 2820, 2830, 2840, 2850, each having a design and placement for a specific use. This includes some of the reflectarrays described herein, to achieve one or more directivities and may incorporate frequency-selective or frequency based reflectarrays. While the descriptions and examples herein focus on rectangular shapes, this is for clarity of understanding. A variety of shapes, materials and configurations may be implemented, such as to adhere to a shape of a support structure, wall, vehicle side and so forth. In some embodiments, the reflectarray is constructed of a transparent metallic material that may be used on windows.

The reflectarray 2810 is a cube shape with reflectarray structure on one or more sides of the cube to provide multiple spatial reflections from multiple sources. The flexibility provided by a cubic Reflectarray 2810 may be sized in a variety of shapes including a prism, a sphere or other 3-dimensional shape. In this way, the reflectarray 2810 may receive incident signals from orthogonal directions.

The reflectarray 2820 is positioned proximate BS 2804 to reflect received signals therefrom to within target area 2890. The reflectarray 2810 may include multiple groupings of reflective elements to achieve the coverage described. Note that Reflectarray 2810 is within target area 2890 and may reflect signals from Reflectarray 2820.

A reflectarray 2830 is configured to support different responses as a function of the frequency of an incident signal. The Reflectarray 2830 includes multiple portions, wherein each portion is designed reflect signals at a different frequency or range of frequencies, such as a first portion to reflect $f_1$ signals that are operative in a health network. These signals are reflected to and from hospital 2862 and mobile health use 2860. Incident signals operative at frequency $f_2$ are reflected to and from a work and play area, such as a gaming system 2870 within area 2872. Frequency $f_3$ is used to provide video streaming services, such as to and from a video streaming device 2880 within area 2882. The reflectarray 2830 has several portions allocated to the desired frequencies.

The reflectarray 2840 is positioned on a building proximate an airport and is designed and positioned to reflect signals to target area therein. Another Reflectarray is proximate BS 2806 and reflects signals within a target area of building 2892 having industrial automation and other devices therein. There may be any number of reflectarrays positioned around the city to support the growing wireless devices that are part of M2M and IoT.

Figure 29:
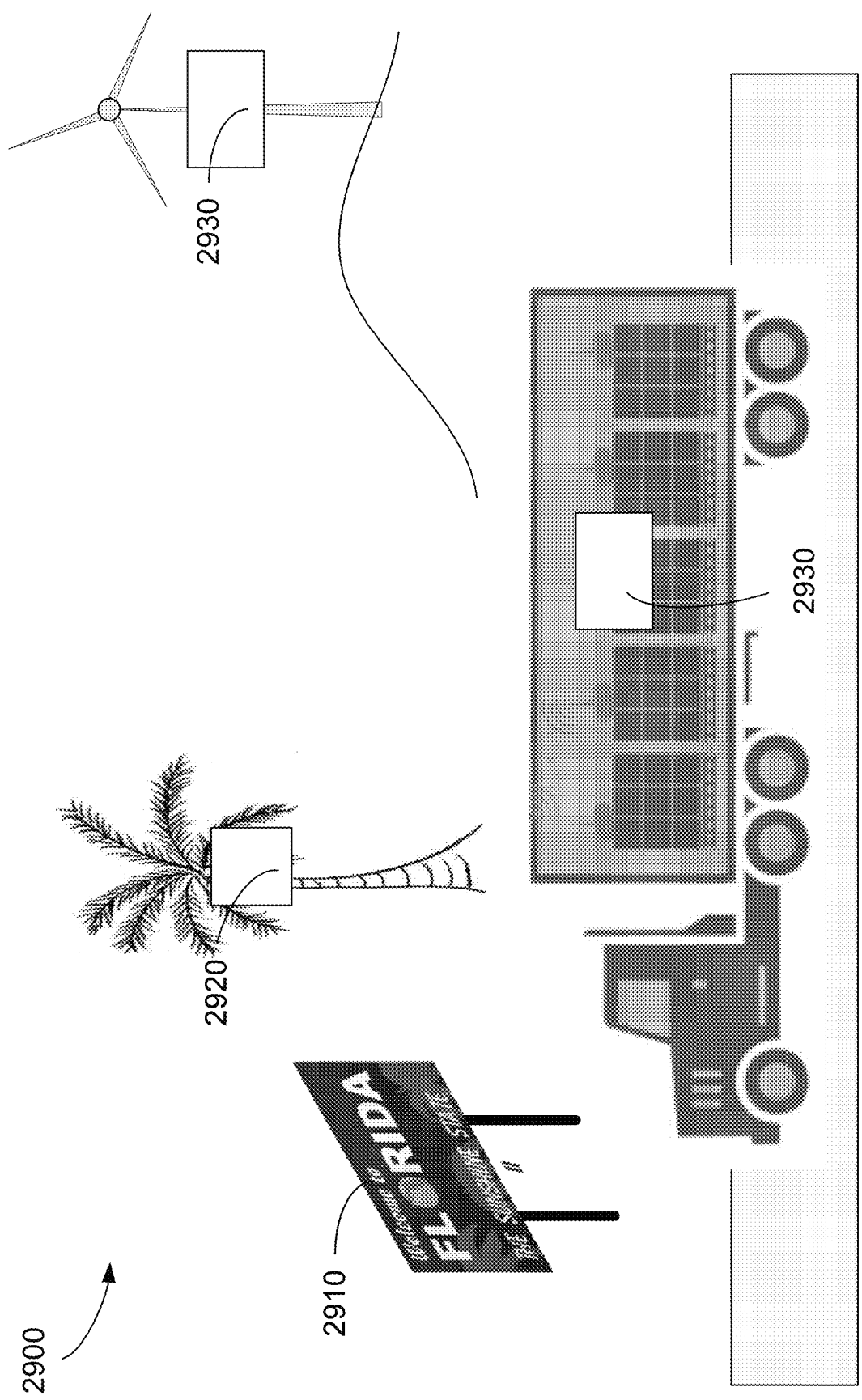
FIG. 29 illustrates a mobile environment have wireless infrastructure elements, according to embodiments of the present invention.
Figure 30:
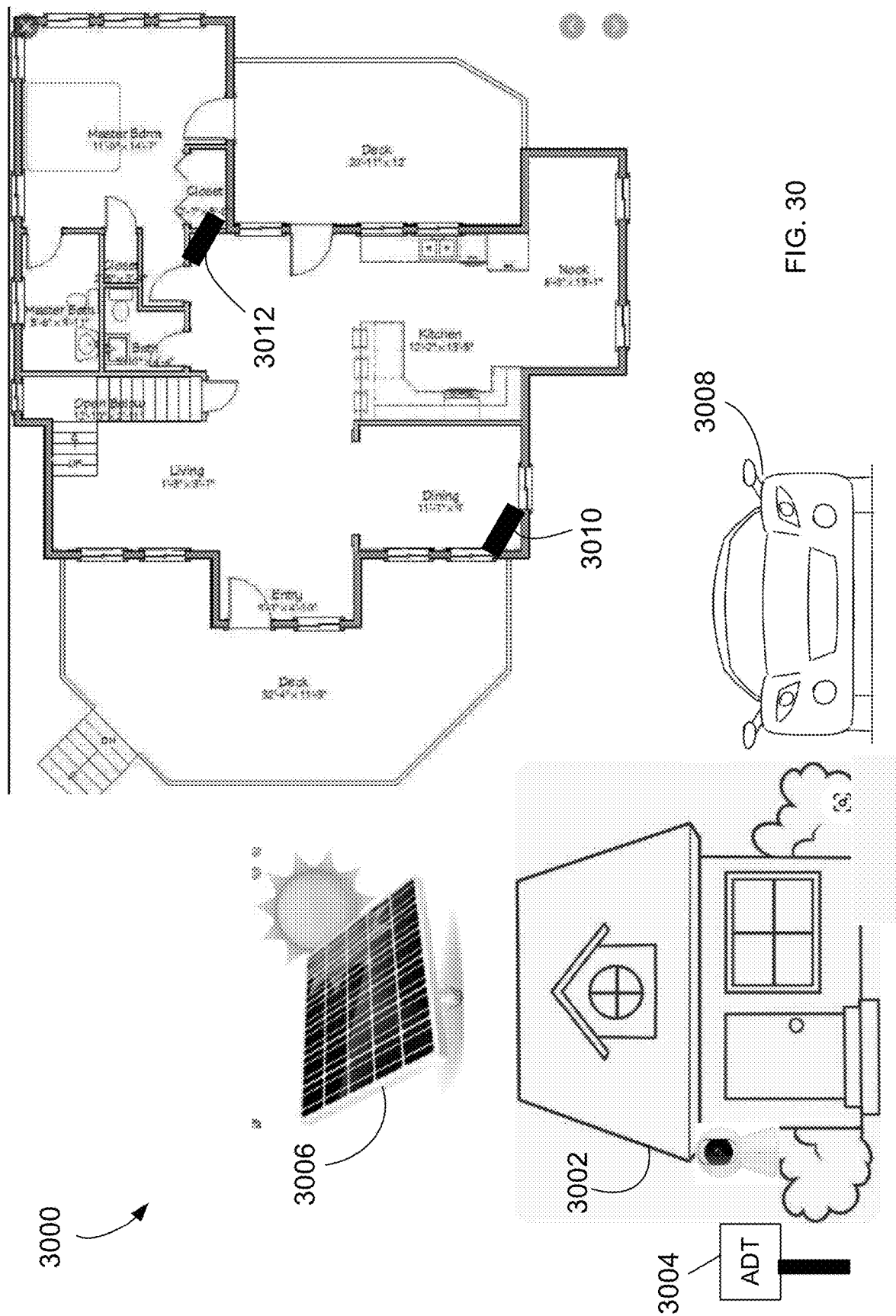
FIG. 30 illustrates an Internet-of-Things system in a home environment, according to embodiments of the present invention.
Figure 31:
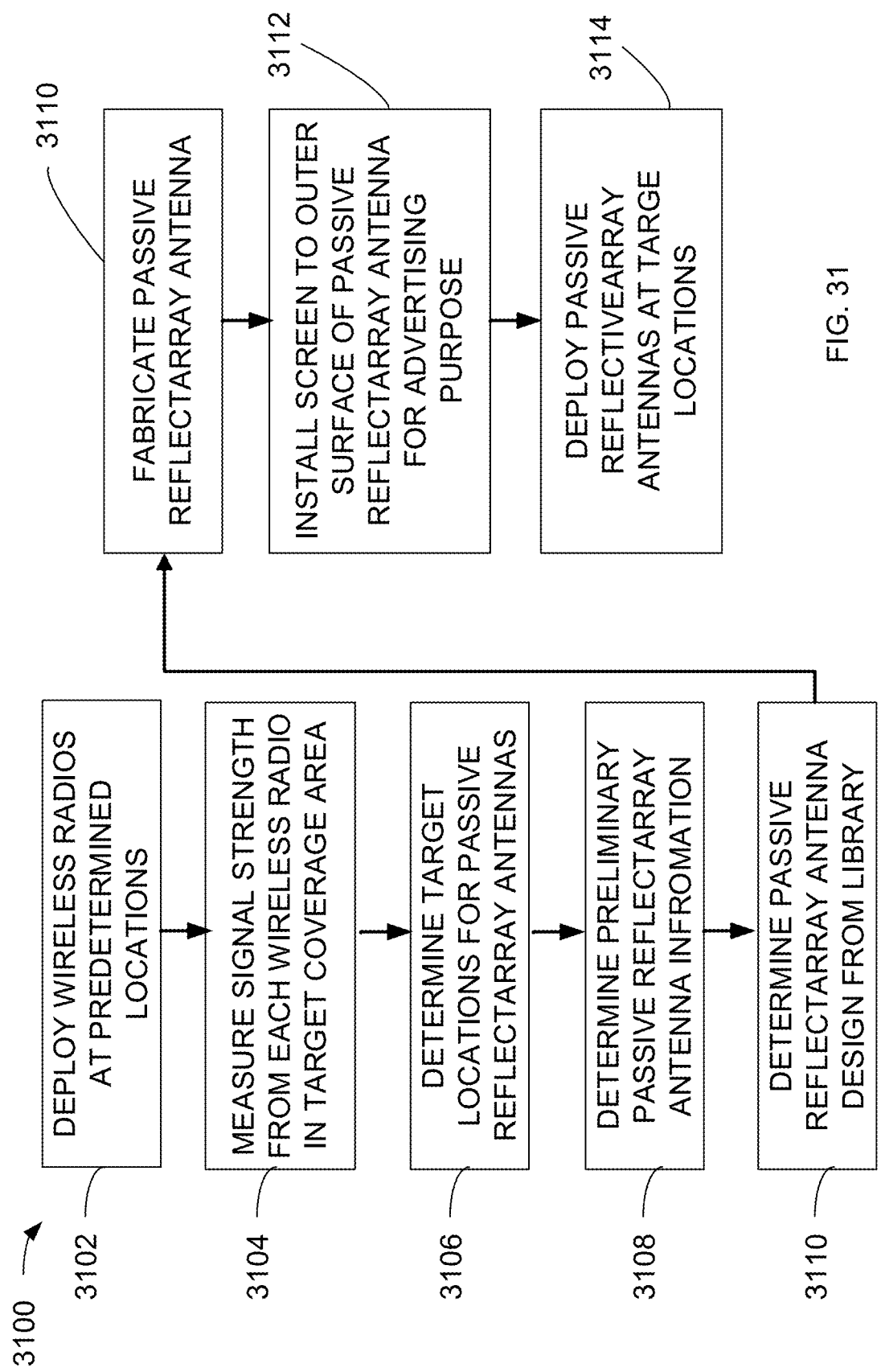
FIG. 31 is a schematic diagrams of a system utilizing MTS reflectarrays for backhaul connections between base stations, according to various examples.

FIG. 29 illustrates a highway environment 2900 having reflectarrays positioned as wireless infrastructure. A reflectarray 2910 is positioned on a billboard next to a highway. Another reflectarray 2920 is positioned in a palm tree, either natural tree or artificial structure that resembles a tree. Still another reflectarray 2920 is positioned on a windmill. The placement of these reflectarrays supports and extends wireless communications along a highway, such as to vehicles as they drive past. In still another embodiment, a reflectarray 2930 is positioned on a truck and provides enhanced reflection of signals incident on the panel 2930. The reflective response of reflectarray 2930 is broad and extends signals in a wide range of angles. The reflectarray 2930 is operative in a beamformed directed signal system or an omnidirectional system and acts to extend signals into areas of NLOS or areas that are subject to interference from other signals and multipaths.

Still further applications are related to home functions, such as for home 3000. The home 3000 includes a security camera 3002, a security system 3004 and a solar energy system 3006, each of which is operated wirelessly and are positioned in known spatial locations. The vehicle 3008 also has wireless communication capability. In this house 3000, reflectarrays 3010, 3012 are positioned within the structure to enable signal transmissions throughout the house 3000 and the surrounding area.

There are a variety of configurations that may be implemented, such as to incorporate a reflectarray panel into a pre-sized mounting on the wall of a building. In FIG. 32, a wall 3200 has an insert 3203 for placement of a reflectarray 3204, having multiple layers and an optional cover 3206, such as for advertising. In this position, the radio 3210 transmit beams that are incident on reflectarray 3204, as incident wave 3212. The reflectarray redirects the incident wave 3212 as reflections 3214. While the cover 3206 sits on the front of reflectarray 3204 it does not interfere with the reflective behavior of the reflectarray 3204.

In some embodiments, the advertisement or cover over the reflectarray may include reflective elements enabling modification of the reflective or redirection behavior of the reflectarray. In FIG. 33, reflectarray 3300 includes an advertisement overlay 3302 having a portion 3304 which is a material acting in coordination with the structure of the reflectarray 3300 to change the angle of reflection or enable a new angle of incidence to achieve the same redirection. In another example, reflectarray 3310 includes an overlay 3312 advertising for BMW. Built into the design of the overlay 3312 are portions 3314 and 3316, each made of one or more materials that act to modify the behavior of reflectarray 3310. In this example, the portion 3314 creates a first direction for reflections and the portion 3316 creates a second direction for reflections. When the overlay 3312 is removed, the reflectarray 3310 performs as originally designed Regarding backhauling (BH) for 5G applications, 5G frequency range 2 (FR2) (millimeter wave (mm Wave) frequency bands) BH is part of the 5G radio access network. In standards, a backhaul link is a link between the 5G core network (5GC) and the base stations, which in a 5G system is referred to as a gNodeB (gnB) base stations). However, the related standards are still open and under development. The trend for the future is to integrate BH with access, which is referred to as integrated access backhaul (IAB). In IAB, base stations are extended via relay nodes, which assume both functions of the relay nodes and the base stations.

Point-to-point (PtP) topology is commonly used in communication networks and will continue to be used for a relatively long time. Optical fiber links were one of the most popular solutions for BH in mobile networks until 4G-LTE, which introduced network densification with the use of smaller cells within the network, such as a 5G mmW small cells. BH with the smaller cells required more optical fiber links, which caused the costs for these BH fiber links to become prohibitive. As such, wireless BH solutions are becoming more and more attractive to mobile network operators (MNOs).

Relaying a BH link is one of the most efficient solutions for network planning and optimization. When a relay node (RN) is deployed, the RN plays the same role as a BS extension node and an access point for the UE. The RN, thus, provides a BH link (a link between a BS and the RN) and an access link (a link between the RN and UE).

Regarding the antenna design for 5G BH, firstly, high performance beamforming is mandatory because high gain is needed to overcome the high path loss, and a narrow beamwidth is necessary to avoid interference (in the presence of strong signals from and/or to neighboring BS and UE). Secondly, since a BS antenna system is designed specifically (it is non-modifiable) because it must support multibeam beamforming and also support multiple user-multiple input, multiple output ("Mu-MIMO"), as constrained by the standards; an antenna (a MTS reflectarray) that is located at a RN could meet the operational requirements as well as be very flexible. This allows a wide space for innovative solutions. As for the network requirements, the antenna must point to the BS with one or more beamforming antennas. This implies that the RN antenna must have a high gain and also a narrow beam in order to work with the BS to provide the BH link, which is a PtP fixed link (however, Point-to-Multiple-Point (PmtP) topology will almost surely also be required).

When a MTS reflectarray is employed for a RN antenna, its BH link beam requirements are as previously discussed above, and its access link pattern is to be designed according to real-field scenarios in terms of beamwidth and direction of the beam. In classical cases of mobile systems until 4G-LTE, the RN should be located at a location closer to the access coverage side than to the BS side, so that the access link is matched to the geographical shape of the coverage area. For 5G RN cases in FR2, due to the high directionality of the beams, this convention could be reversed, where the RN could be located closer to the BS side than to the access coverage side. In addition, a longer range between the RN and UE coverage must be supported by the RN, when the UE coverage is not in sight from the BS. Also, the synchronization and random-access system procedure of the system must be supported for beamforming management, in a totally transparent way to the RN.

FIGS. 34A to 37 illustrate example systems utilizing MTS reflectarrays for implementing wireless backhaul connections. Specifically, FIGS. 34A-36B depict simplistic systems to illustrate some of the various components that may be used in conjunction with MTS reflectarrays operating as relays for backhaul connections. Different components that may be employed with the MTS reflectarrays for backhaul connections include, but are not limited to, base stations, relay nodes, user equipment, and core networks.

Figure 34A:
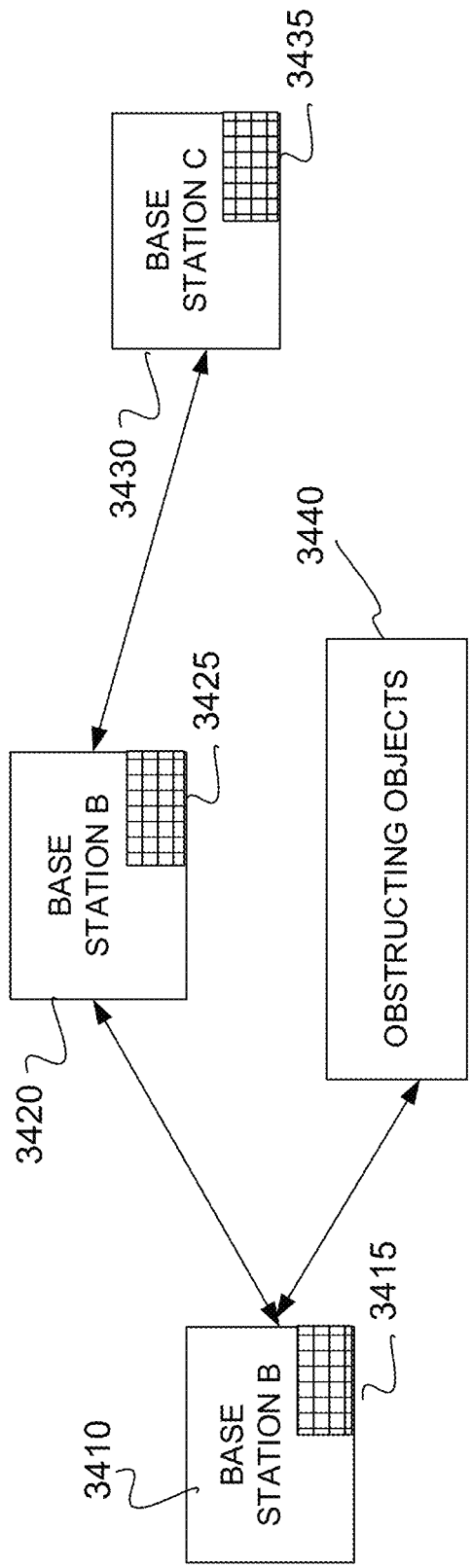
FIG. 34A and FIG. 34B are a schematic diagram of a 5G system utilizing MTS reflectarrays for backhaul connections between a base station, relay nodes, and user equipment, according to various examples.
Figure 34B:
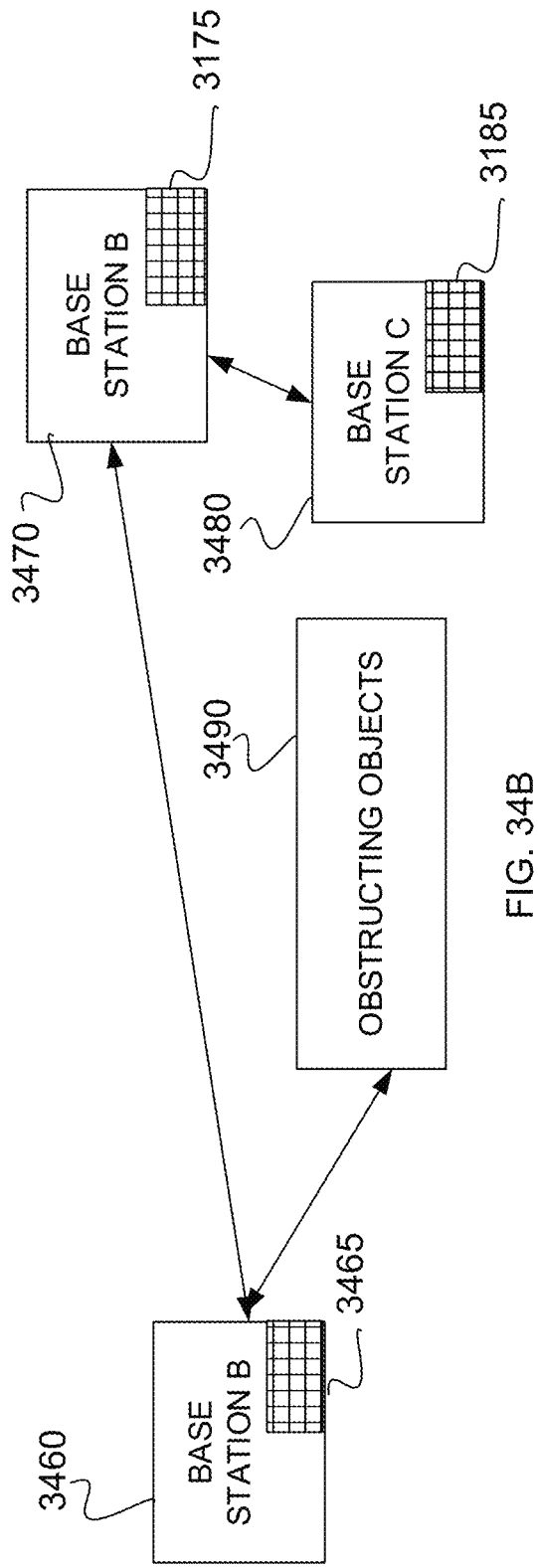

In particular, FIGS. 34A and 34B are each schematic diagrams of a system 3400, 3450 utilizing MTS reflectarrays 3415, 3425, 3435, 3465, 3475, 3485 for backhaul connections between base stations 3410, 3420, 3430, 3460, 3470, 3480, according to various examples. In FIG. 34A, the system 3400 is illustrated to comprise three base stations (BS) A 3410, BS B 3420, and BS C 3430). In one or more examples, BS A 3410, BS B 3420, and BS C 3430 each employ a respective MTS reflectarray 3415, 3425, 3435, which is used to transmit and receive wireless signals, RF beams, between each other. In some examples, the MTS reflectarrays 3415, 3425, 3435 are mounted onto the base stations. For example, each of the MTS reflectarrays 3415, 3425, 3435 may be mounted onto an exterior side of its associated base station.

In one or more examples, the MTS reflectarrays 3415, 3425, 3435 each comprise a plurality of MTS cells, wherein each of the MTS cells comprises a reflector element, which may comprise a MTS reflector element, a dipole element, or a miniature element. In some examples, the MTS reflectarrays 3415, 3425, 3425 each comprises a dielectric layer mounted on a ground metal plane or substrate, where the reflector elements are etched or deposited on the dielectric layer. In addition, the reflector elements of each of the MTS reflectarrays 3415, 3425, 3435 are designed and configured to each have a respective reflection phase to generate at least one RF beam per MTS reflectarray 3415, 3425, 3435.

In some instances, obstructing objects, such as structures, large buildings, walls, and so forth, may be located within the transmission path of communications signals, such as signals that are radiated from base stations, such as a gNodeB 5G base stations. These obstructing objects can impede the transmission of the signals and, thus, can cause a degradation in the antenna coverage areas of the base stations. In one or more examples, MTS reflectarrays may be employed as relays for backhaul connections to route the signals transmitted from the base stations around the obstructing objects.

In FIG. 34A, obstructing objects 3440 are in the Line-of-Sight (LOS) between BS A 3410 and BS C 3430. As such, the obstructing objects 3440 disrupt the transmitting and receiving of the wireless signals by BS A 3410 and BS C 3430, thereby degrading the coverage areas of BS A 3410 and BS C 3430. In this example, to improve the degraded coverage areas of BS A 3410 and BS C 3430, BS B 3420 operates as a relay between BS A 3410 and BS C 3430.

During operation of this system 3400, the reflector elements on the MTS reflectarray 3415 of BS A 3410 transmit a RF signal (in the form of a RF beam) towards BS B 3420. The reflector elements of the MTS reflectarray 3425 of BS B 3420 receive and reflect the RF signal to generate a RF beam (a reflected electromagnetic (EM) wave). The phase distribution across the aperture of the MTS reflectarray 3425 is such that the reflector elements radiate together in unison to form a single RF beam (radiate together to form a sum pattern beam). The generated RF beam is radiated towards BS C 3430. The reflector elements of the MTS reflectarray 3435 of BS B 3430 receive and reflect the RF beam (a RF signal) to generate another RF beam.

Similar to the system 3400 of FIG. 34A, the system 3450 of FIG. 34B comprises three base stations (BS D 3460, BS E 3470, and BS F 3480) that each employ a respective MTS reflectarray 3465, 3475, 3485, which is used to transmit and receive wireless signals (RF beams) between the base stations. Similar to the MTS reflectarrays 3415, 3425, 3435 of FIG. 34A, the MTS reflectarrays 3465, 3475, 3485 of FIG. 34B each comprise a plurality of MTS cells (refer to 602 of FIG. 6), which each comprise a reflector element (a MTS reflector element (refer to 604 of FIG. 6), a dipole element (refer to 608 of FIG. 6), or a miniature element (refer to 612 of FIG. 6)). In addition, the MTS reflectarrays 3465, 3475, 3485 may each comprise a dielectric layer (refer to 806 of FIG. 8) mounted on a ground metal plane (refer to 802 of FIG. 8), where the reflector elements are etched or deposited (refer to 804 of FIG. 8) on the dielectric layer.

In FIG. 34B, obstructing objects (high buildings) 3490 are in the LOS between BS D 3460 and BS F 3480 and disrupt the transmitting and receiving of the wireless signals by BS D 3460 and BS F 3480, thereby impeding the coverage areas of BS D 3460 and BS F 3480. In this example, BS E 3470 operates as a relay between BS D 3460 and BS F 3480 to improve the coverage areas of BS D 3460 and BS F 3480.

During operation of this system 3450, the reflector elements on the MTS reflectarray 3465 of BS D 3560 radiate a RF signal (a RF beam) in the direction of BS E 3470. The reflector elements of the MTS reflectarray 3475 of BS E 3470 receive and reflect the RF signal to generate a RF beam. The phase distribution across the aperture of the MTS reflectarray 3475 cause the reflector elements to radiate together to form a single RF beam (a sum pattern beam). The generated RF beam radiates towards BS F 3480. The reflector elements of the MTS reflectarray 3485 of BS F 3480 receive and reflect the RF beam to generate and radiate another RF beam.

It should be noted that in one or more examples, the systems 3400, 3450 of FIGS. 34A and 34B may employ relay nodes instead of any or all the base stations (BS) A 3410, BS B 3420, BS C 3430, BS D 3460, BS E 3470, and BS F 3480) as is illustrated. In addition, in some examples, some of the base stations, such as BS C 3430 and/or BS F 3480, may or may not each comprise a MTS reflectarray 3435, 3485 as is illustrated.

Figure 35A:
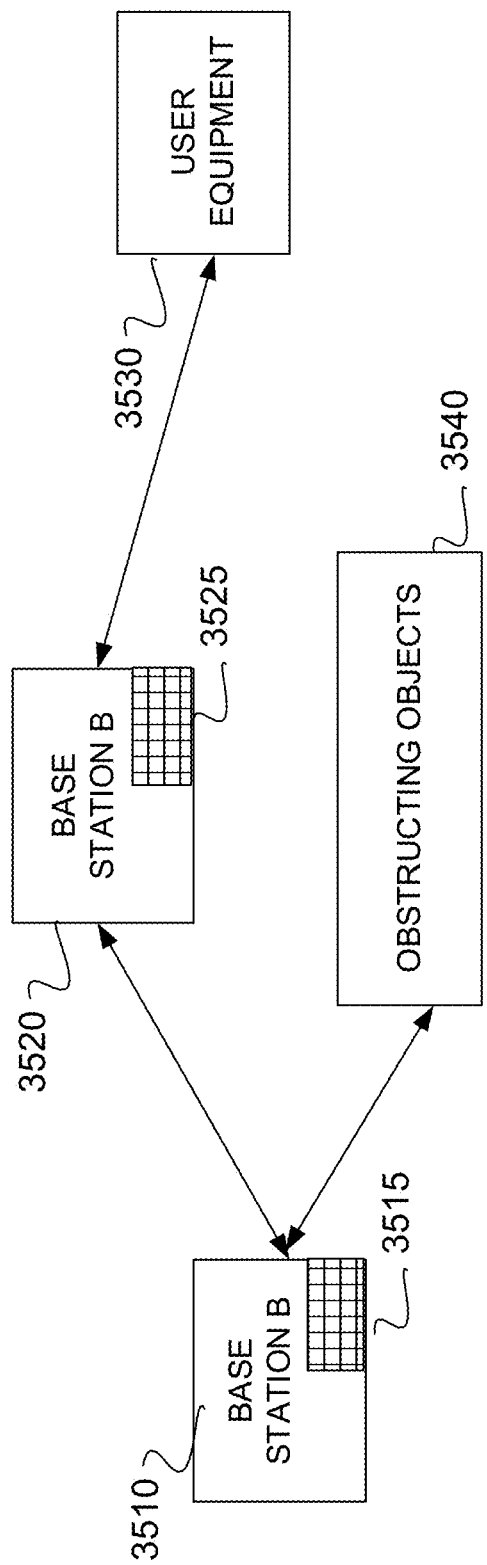
FIG. 35A and FIG. 35B are a schematic diagram of a 5G system utilizing MTS reflectarrays for backhaul connections between a base station, relay nodes, user equipment, and a core network, according to various examples.
Figure 35B:
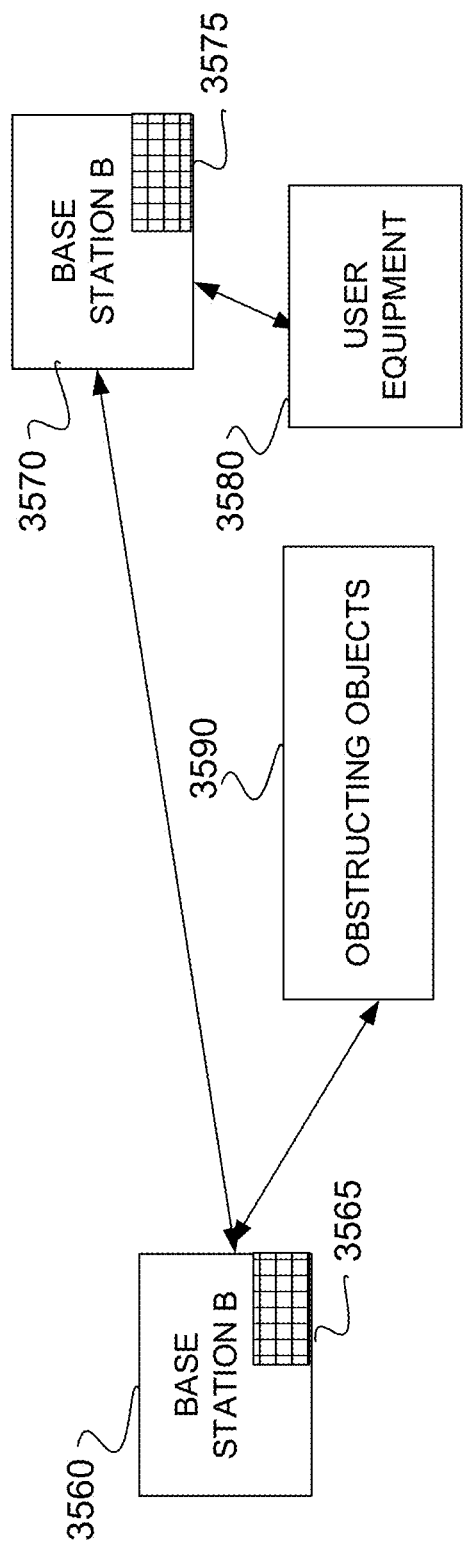

FIGS. 35A and 35B are each schematic diagrams of a system 3500, 3550 utilizing MTS reflectarrays for backhaul connections between base stations 3540, 3520, 3560, 3570 and user equipment (UE) 3530, 3580, according to various examples. The systems 3500, 3550 of FIGS. 35A and 35B are similar to the systems 3400, 3450 of FIGS. 34A and 34B except that the systems 3500, 3550 of FIGS. 35A and 35B employ user equipment 3530, 3580 instead of some of the base stations (BS C 3430 and BS F 3480) as is illustrated in FIGS. 34A and 34B. In one or more examples, the systems 3500, 3550 may comprise various types of UE for the UE 3530, 3580. Different types of UE that may be employed for the UE 3530, 3580 of systems 3500, 3550 include, but are not limited to, mobile devices, such as cellular phones and smart phones.

In FIG. 35A, BS B 3520 operates as a relay between BS A 3510 and UE 3530 to improve the coverage areas of BS A 3510 and UE 3530, which have been degraded by the obstructing objects (high buildings) 3540. During operation of this system 3500, the reflector elements on the MTS reflectarray 3515 of BS A 3510 transmit a RF signal (RF beam) towards BS B 3520. The reflector elements of the MTS reflectarray 3525 of BS B 3520 receive and reflect the RF signal to generate and radiate a RF beam. The phase distribution across the aperture of the MTS reflectarray 3525 cause the reflector elements to radiate together to form a single RF beam (a sum pattern beam) that radiates towards UE 3530.

In FIG. 35B, obstructing objects (high buildings) 3590 disrupt the transmitting and receiving of the wireless signals by BS D 3560 and UE 3580 and, as such, the coverage areas of BS D 3560 and US 3580 are degraded. To improve the coverage areas of BS D 3560 and UE 3580, BS E 3570 is employed to operate as a relay between BS D 3560 and UE 3580. During operation of this system 3550 of FIG. 35B, the reflector elements on the MTS reflectarray 3565 of BS D 3560 transmit a RF signal (a RF beam) in the direction of BS E 3570. The reflector elements of the MTS reflectarray 3575 of BS E 3570 receive and reflect the RF signal to generate a RF beam. The phase distribution across the aperture of the MTS reflectarray 3575 of BS E 3570 is such that the reflector elements radiate to form a single RF beam (a sum pattern beam) directed towards UE 3580.

Figure 36A:
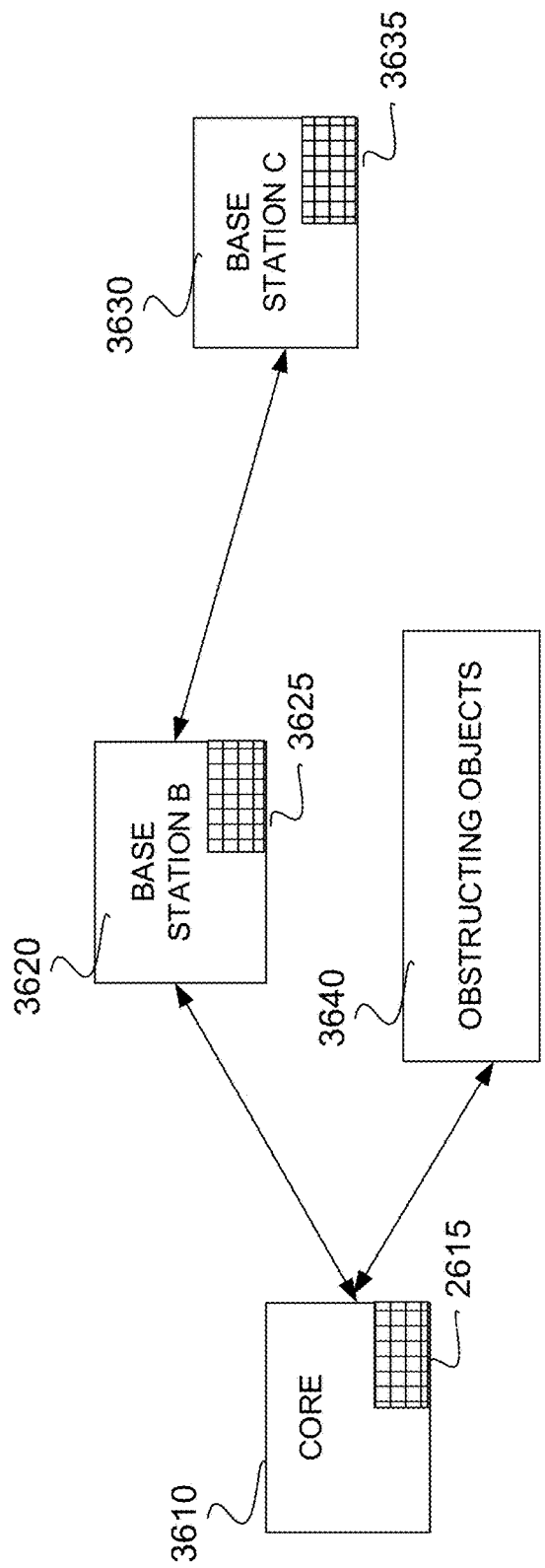
FIG. 36A and FIG. 36B illustrate a flow chart illustrating a method for backhaul connections according to various examples.
Figure 36B:
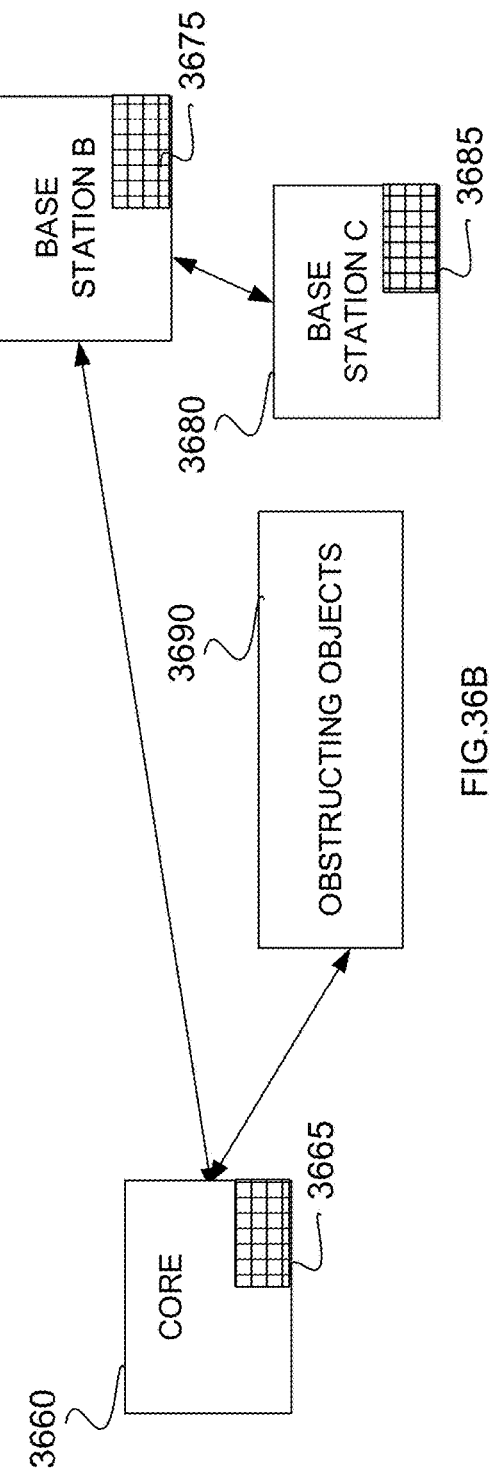

FIGS. 36A and 36B are each schematic diagrams of a system 3600, 3650 utilizing MTS reflectarrays for backhaul connections between base stations 3620, 3630, 3670, 3680 and a core network 3610, 3660, according to various examples. The systems 3600, 3650 of FIGS. 36A and 36B are similar to the systems 3400, 3450 of FIGS. 34A and 34B except that the systems 3600, 3650 of FIGS. 36A and 36B employ core networks 3610, 3660 instead of some of the base stations, such as BS A 3410 and BS D 3460, as is illustrated in FIGS. 34A and 34B.

In FIG. 36A, obstructing objects (high buildings) 3640 are illustrated to impede the transmitting and receiving of the wireless signals by the core network 3610 and BS C 3630 by being in the LOS of the core network 3610 and BS C 3630. This, in turn, causes the coverage areas of the core network 3610 and BS C 3630 to be degraded. The system 3600 employs BS B 3620 to operate as a relay between the core network 3610 and BS C 3630. During operation of the system 3600, the reflector elements on the MTS reflectarray 3615 of the core network 3610 transmit a RF signal towards BS B 3620. The reflector elements of the MTS reflectarray 3625 of BS B 3620 receive and reflect the RF signal to generate a RF beam. The phase distribution across the aperture of the MTS reflectarray 3625 of BS B 3620 causes the reflector elements to radiate together in unison to form a single RF beam (a sum pattern beam). The generated RF beam radiates towards BS C 3630. The reflector elements of the MTS reflectarray 3635 of BS C 3630 receive and reflect the RF beam to generate another RF beam.

In FIG. 36B, obstructing objects (high buildings) 3690 are in the LOS of the core network 3660 and the BS F 3680, thereby degrading the coverage areas of the core network 3660 and the BS F 3680. BS E 3670 operates as a relay between the core network 3660 and BS F 3680 to improve the coverage areas of the core network 3660 and BS F 3680, which have been degraded. During operation of this system 3650, the reflector elements on the MTS reflectarray 3665 of the core network 3660 transmit a RF signal (a RF beam) in the direction of BS E 3670. The reflector elements of the MTS reflectarray 3675 of BS E 3670 receive and reflect the RF signal to generate a RF beam. The phase distribution across the aperture of the MTS reflectarray 3675 of the BS E 3670 is such that the reflector elements radiate together to form a single RF beam (a sum pattern beam) that radiates in the direction of BS F 3680. The reflector elements of the MTS reflectarray 3685 of BS F 3680 receive and reflect the RF beam to generate another RF beam.

Figure 37:
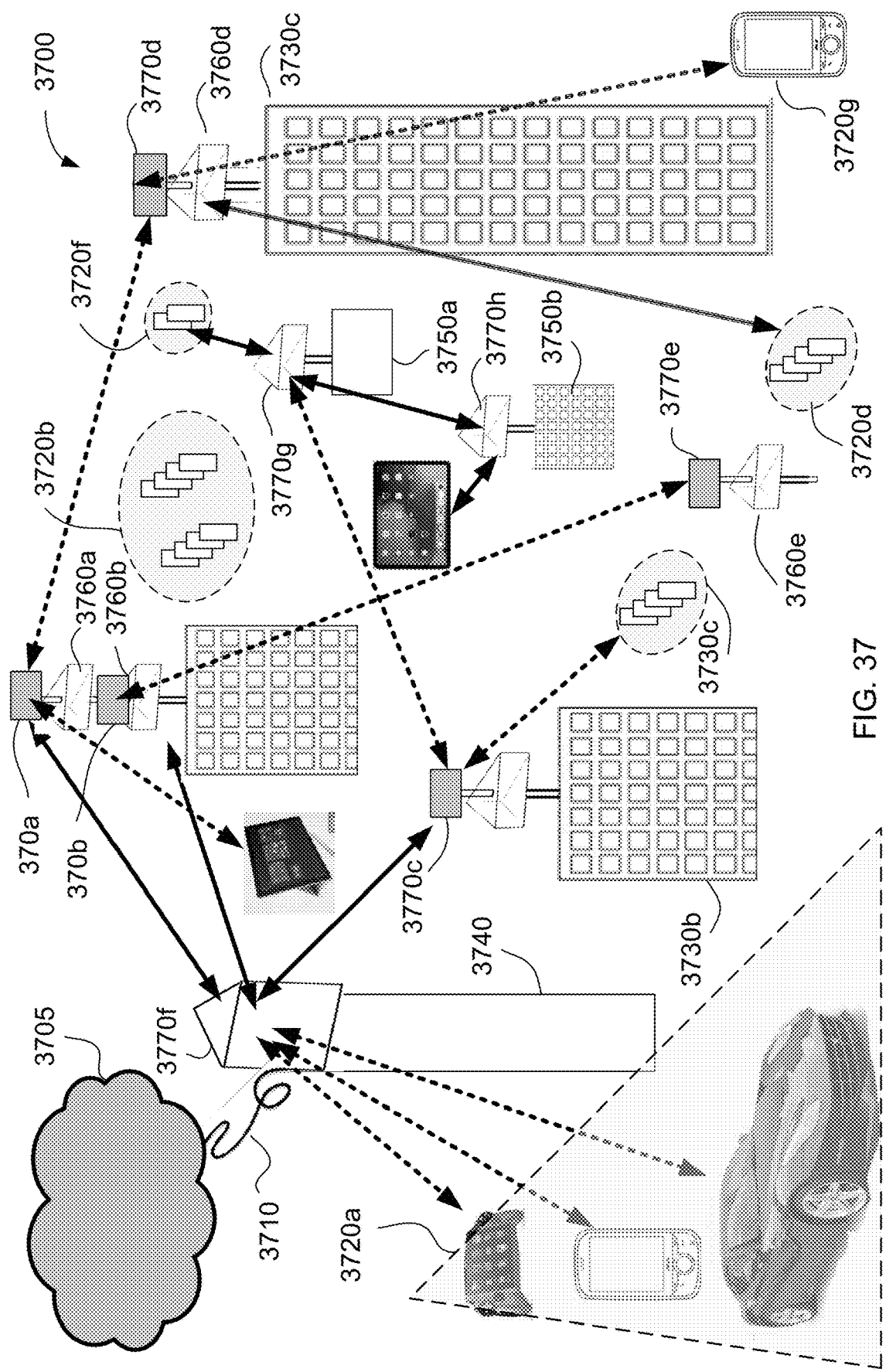
FIG. 37 illustrates a beamforming wireless network and reflectarrays for distributing signals, according to embodiments of the present invention.

FIG. 37 illustrates a beamforming system, such as a 5G system, incorporating MTS reflectarrays for backhaul connections within the 5G network. In particular, FIG. 37 is a schematic diagram of a 5G system 3700 utilizing MTS reflectarrays 3770*a*-3770*h* for backhaul connections between a base station 3740, relay nodes 3760*a*-3760*e*, 3750*a*, 3750*b*, and user equipment 3720*a*-3720*g*, according to various examples.

In this figure, the system 3700 is illustrated to comprise a core network (e.g. 5G core network) 3705 communicating with a BS (5G FR2 (gnB)) 3740 via optical fiber links 3710. The BS 3740 comprises a plurality of MTS reflectarrays 3770*f* that are used to radiate beams towards UE (mobile devices, such as mobile phones) 3720*a* associated with users (network customers).

Multiple large buildings 3730*a*, 3730*b*, 3730*c*, however, present themselves as obstacles to the transmission of RF beams from the BS 3740 to other UE 3720*b*-3720*g* located in the network. As such, a plurality of relay nodes (RNs) 3760*a*-3760*e*, 3750*a*, 3750*b* is deployed in various locations throughout the network to allow for an increased coverage area of the BS 3740. Several the RNs 3760*a*-3760*d* are illustrated to be mounted onto the buildings, while the other RNs 3760*e*, 3750*a*, 3750*b* are free standing units. Each RN 3760*a*-3760*e*, 3750*a*, 3750*b* comprises at least one MTS reflectarray 3770*a*-3770*e*, 3770*g*, 3770*h*. The MTS reflectarrays 3770*a*-3770*e*, 3770*g*, 3770*h* are each configured to transmit and/or to receive at least one RF beam in the direction of UE 3720b-3720g or in the direction of other MTS reflectarrays 3770a-3770h associated with neighboring RNs 3760a-3760e, 3750a, 3750b.

During operation of the MTS reflectarrays 3770a-3770h, the reflector elements of the MTS reflectarrays 3770a-3770h receive and reflect a RF signal (RF beam) to generate a RF beam that radiates in the direction of UE 3720b-3720g or towards MTS reflectarrays 3770a-3770h of neighboring RNs 3760a-3760e, 3750a, 3750b FIG. 25 is a schematic diagram of a 5G system 2500 utilizing MTS reflectarrays 2570a-2570h for backhaul connections (amongst buildings 2530a-2530c) between a base station 2540, relay nodes 2560a-2560e, 2550a, 2550b, user equipment 2520a-2520g, and a core network 2505, according to various examples. The system 2500 of FIG. 25 is similar to the system 3700 of FIG. 37 except that the core network (5G core network) 2505 of the system 2500 of FIG. 25 communicates with the BS 2540 via a wireless link 2510 instead of optical fiber links 3710, as is illustrated for the system 3700 in FIG. 37. In FIG. 25, BS 2540 employs a MTS reflectarray 2570f to communicate wirelessly with the core network 2505. As such, the MTS reflectarray 2570f is configured to radiate and/or to receive at least one RF beam to and/or from the core network 2505. It should be noted that the use of wireless BH links 2510 to communicate with the core network 2505 as opposed to optical fiber BH links 3710 allows for a reduction in the costs of BH since the costs required for installing and maintaining the optical fiber links 3710 will be eliminated.

Focused meta-structure based reflectarrays for enhanced wireless communications are disclosed. The reflectarrays are suitable for many different 5G and other wireless applications and can be deployed in a variety of environments and configurations. In various examples, the reflectarrays are arrays of cells having meta-structure based reflector elements that reflect incident radio frequency ("RF") signals from various directions into a focused, directional beam in a single direction. The meta-structure based reflector elements may be meta-structures, which, as generally defined herein, are engineered, non- or semi-periodic structures that are spatially distributed to meet a specific phase and frequency distribution. A focused meta-structure based reflector element is designed to be very small relative to the wavelength of the reflected RF signals. The reflectarrays are able to operate at the higher frequencies required for 5G and at relatively short distances. Their design and configuration are driven by geometrical and link budget considerations for a given application or deployment, whether indoors or outdoors.

Figure 38:
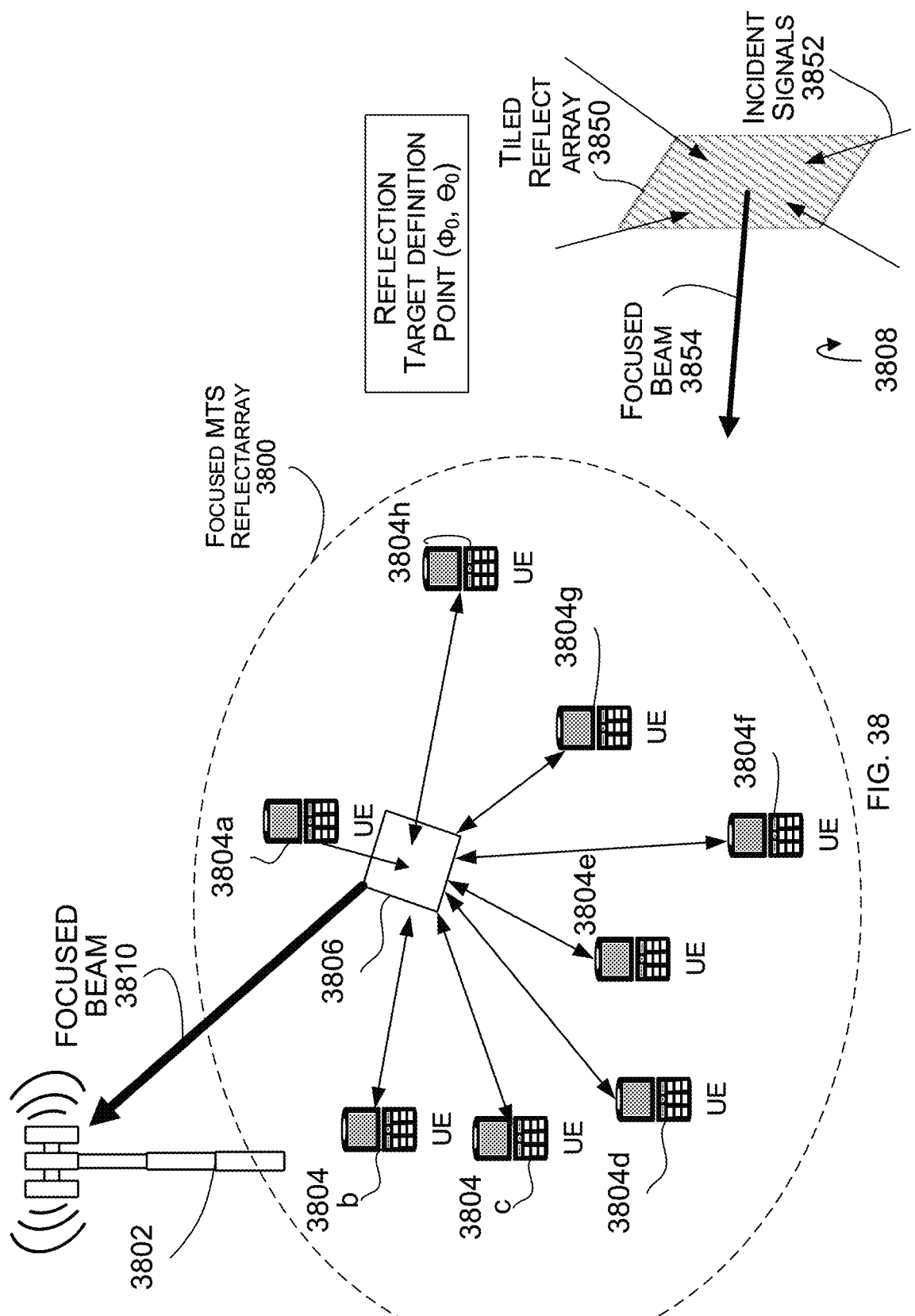
FIG. 38 illustrates an environment in which a focused meta-structure based reflectarray is deployed to enhance wireless communications in accordance to various examples.

FIG. 38 illustrates an environment in which a focused meta-structure based reflectarray is deployed to enhance wireless communications according to various examples. Wireless network 3800 serves user equipment ("UE") within transmission and reception range of at least one wireless base station ("BS"), such as BS 3802. BS 3802 transmits and receives wireless signals from UE within its coverage area, such as UE 3804a-h. The coverage area may be disrupted by buildings or other structures in the environment, which may affect the quality of the wireless signals. As described in more detail below, wireless coverage for UE 3804a-h can be significantly improved by the installation of a focused meta-structure based reflectarray 3806 within their vicinity. Although a single reflectarray 3806 is shown for illustration purposes, multiple such reflectarrays may be placed in wireless network 3800 as desired.

In various examples, reflectarray 3806 is able to act as a relay between BS 3802 and UE 3804a-h. Reflectarray 3806 receives signals from UE 3804a-h from multiple incident directions and reflects each signal into a focused, directional beam aimed for the BS 3802. Cutout 3808 shows the incident rays coming from a reflection target point in the reflectarray with elevation angle $\theta_0$ and azimuth angle $\varphi_0$. The directivity of reflectarray 3806 is achieved by considering the geometrical configurations of the wireless network 3800 (e.g., placement of BS 3802, distance relative to reflectarray 3806, etc.) as well as link budget calculations from BS 3802 to reflectarray 3806 in network 3800, as described in more detail hereinbelow. Various configurations, shapes, and dimensions may be used to implement specific designs and meet specific constraints. The reflectarray 3806 can be placed in any wireless network environment, be it in a suburban quiet area or a high traffic, high density city block. Use of a reflectarray such as reflectarray 3806 and designed as disclosed herein can result in a significant performance improvement of even 10 times current 5G data rates. Reflectarray 3806 is a low cost, easy to manufacture and set up reflectarray, and may be self-calibrated without requiring manual adjustment to its operation.

Figure 39:
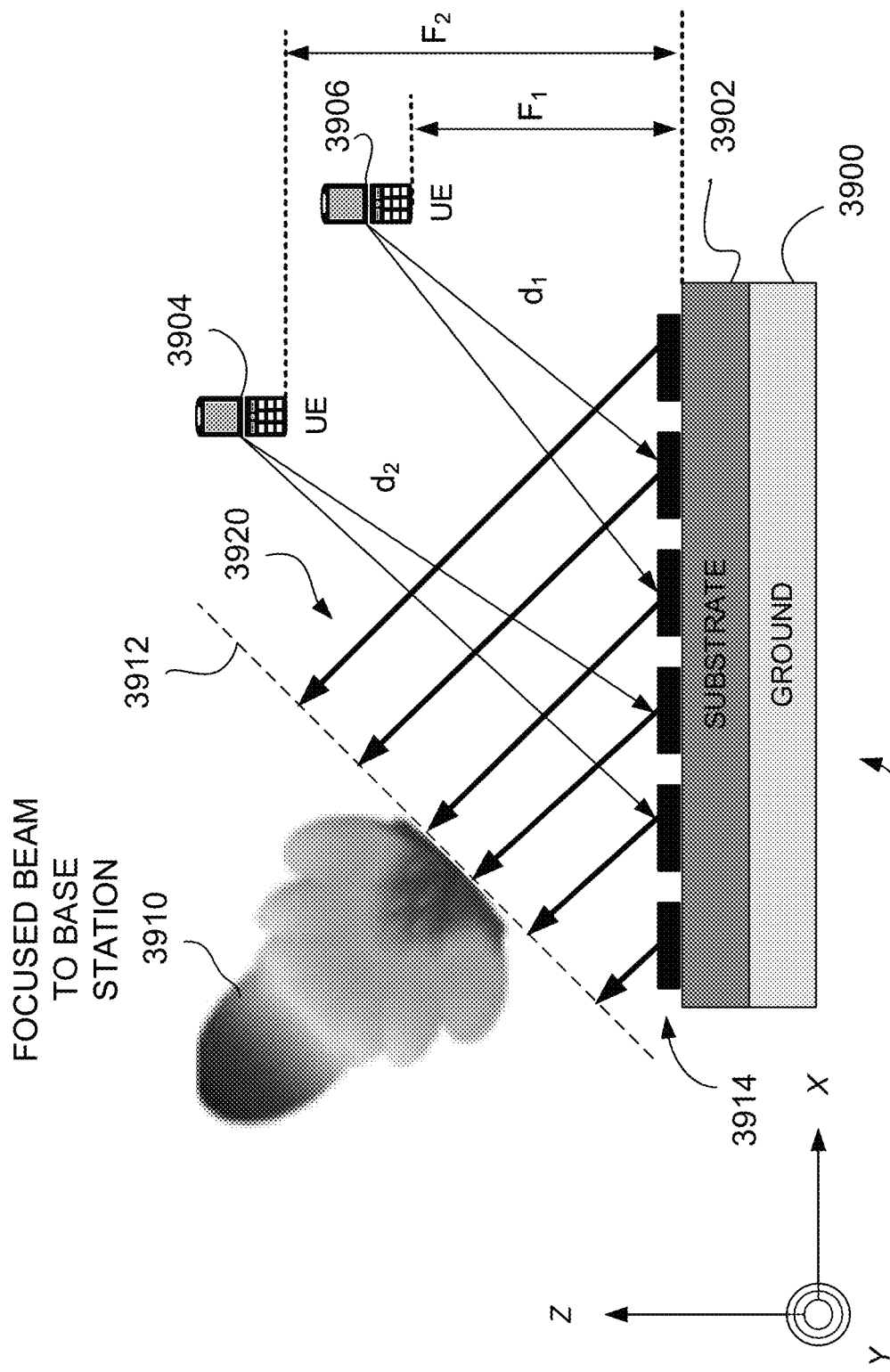
FIG. 39 illustrates a radiation pattern from a reflectarray in accordance to various examples.

FIG. 39 illustrates a far field radiation pattern 3906 that is generated from reflectarray 3900 having a metal ground plane, a dielectric substrate and a patterned metal layer with the reflectarray cells having reflector elements, e.g., MTS reflector elements. As illustrated, UE 3902 and UE 3904 send RF signals to reflectarray 3900 from respective distances of $d_1$ and $d_2$. Those RF signals are then reflected from each cell in reflectarray 3900 with a focused radiation pattern 3906 directed to the BS serving UE 3902-3904. The constructive behavior of the RF beams from all cells in reflectarray 3900 is effectively an antenna gain that results in significant improvements in wireless coverage and performance to UE communicating with a BS within the vicinity of reflectarray 3900.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples illustrated herein but is to be accorded the widest scope consistent with the principles and novel features disclosed herein.

As used herein, the phrase "at least one of" preceding a series of items, with the terms "and" or "or" to separate any of the items, modifies the list as a whole, rather than each member of the list (i.e., each item).The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Furthermore, to the extent that the term "include," "have," or the like is used in the description or the claims, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more." The term "some" refers to one or more.

Underlined and/or italicized headings and subheadings are used for convenience only, do not limit the subject technology, and are not referred to in connection with the interpretation of the description of the subject technology. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of implementations of the subject matter. Certain features that are described in this specification in the context of separate implementations can also be implemented in combination in a single implementation. Conversely, various features that are described in the context of a single implementation can also be implemented in multiple implementations separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

The subject matter of this specification has been described in terms of aspects, but other aspects can be implemented and are within the scope of the following claims. For example, while operations are depicted in the drawings in a particular order, this should not be understood as requiring that such operations be performed in the particular order illustrated or in sequential order, or that all illustrated operations be performed, to achieve desirable results. The actions recited in the claims can be performed in a different order and still achieve desirable results. As one example, the processes depicted in the accompanying figures do not necessarily require the order illustrated, or sequential order, to achieve desirable results. Moreover, the separation of various system components in the aspects described above should not be understood as requiring such separation in all aspects, and it should be understood that the described program components and systems can generally be integrated together in a single hardware product or packaged into multiple hardware products. Other variations are within the scope of the following claim.

What is claimed is:

1. A wireless infrastructure apparatus, comprising:
   a substrate;
   a reflectarray layer on the substrate,
   the reflectarray layer comprising a plurality of reflector elements; and
   an overlay for the reflectarray layer; wherein the overlay comprises a reflector element positioned on the overlay to modify a directivity of at least one reflectarray.

2. The wireless infrastructure apparatus as in claim 1, wherein reflectarray layer includes a first reflectarray and a second reflectarray each positioned to receive incident waves and reflect the incident waves into a first area and a second area.

3. The wireless infrastructure apparatus as in claim 2, wherein the first reflectarray has a first directivity and the second reflectarray has a second directivity, and wherein the plurality of reflector elements are meta-structure elements.

4. The wireless infrastructure apparatus as in claim 2, wherein the reflectarray layer has reciprocal directivity for user signals received from outside a line of sight area and reflect the user signals to a radio transmitter.

5. The wireless infrastructure apparatus as in claim 3, wherein a set of the plurality of reflector elements comprise a first size element and a second size element different from the first size element.

6. The wireless infrastructure apparatus as in claim 3, wherein the at least one reflectarray comprises a first grouping of the plurality of reflector elements having a first directivity and a second grouping of the plurality of reflector elements having a second directivity.

7. The wireless infrastructure apparatus as in claim 1, wherein a set of the plurality of reflector elements is selected from a catalog of reflectarray configurations.

8. The wireless infrastructure apparatus as in claim 1, wherein the overlay is selected from a catalog of overlays.

9. The wireless infrastructure apparatus as in claim 1, wherein the reflectarray is a passive reflector, in a fixed position.

10. The wireless infrastructure apparatus as in claim 9, wherein the fixed position is between a radio transmitter and a non-line of sight area, wherein the passive reflector receives incident wave signals from the radio transmitter and reflects the incident wave signals into the non-line of sight area.

11. The wireless infrastructure apparatus as in claim 10, wherein the reflectarray layer comprises a patterned metal layer.

12. The wireless infrastructure apparatus as in claim 1, further comprising a removable cover.

13. The wireless infrastructure apparatus as in claim 1, wherein the reflectarray layer is adapted to reflect signals for coverage of a geographical area.

14. The wireless infrastructure apparatus as in claim 13, wherein the reflectarray layer receives incident Radio Frequency (RF) signals in a wireless communication system.

15. The wireless infrastructure apparatus as in claim 1, wherein the wireless infrastructure apparatus is a passive device.

16. The wireless infrastructure apparatus as in claim 1, wherein the reflectarray layer reflects incident RF waves with increased signal gain.

17. The wireless infrastructure apparatus as in claim 16, wherein the plurality of reflector elements are smaller than a wavelength of the incident RF waves.

18. The wireless infrastructure apparatus as in claim 1, further comprising a second reflectarray layer responsive to reflect signals at a second directivity.

19. The wireless infrastructure apparatus as in claim 1, wherein the reflectarray form a stack.

* * * * *